US012659842B2

(12) United States Patent
Murugaiyan et al.

(10) Patent No.: US 12,659,842 B2
(45) Date of Patent: Jun. 16, 2026

(54) SYSTEMS AND METHODS FOR MAINTAINING UL SYNCHRONIZATION AND UPDATED CELL INFORMATION DURING NTN CONNECTIVITY

(71) Applicant: SAMSUNG ELECTRONICS CO., LTD., Suwon-si (KR)

(72) Inventors: Vivek Murugaiyan, Bangalore (IN); Kailash Kumar Jha, Bangalore (IN); Mohammad Umair, Bangalore (IN); Nishant, Bangalore (IN); Amit Anandrao Dange, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 347 days.

(21) Appl. No.: 18/595,940

(22) Filed: Mar. 5, 2024

(65) Prior Publication Data

US 2024/0306077 A1     Sep. 12, 2024

(30) Foreign Application Priority Data

Mar. 6, 2023     (IN) .............................. 202341014949

(51) Int. Cl.
*H04W 48/10*          (2009.01)
*H04W 4/90*           (2018.01)
                    (Continued)

(52) U.S. Cl.
CPC ............. *H04W 48/10* (2013.01); *H04W 4/90* (2018.02); *H04W 76/27* (2018.02); *H04W 84/06* (2013.01)

(58) Field of Classification Search
CPC ....... H04W 48/10; H04W 4/90; H04W 76/27; H04W 84/06; H04W 76/20;
                    (Continued)

(56) References Cited

U.S. PATENT DOCUMENTS

2007/0230394 A1*  10/2007  Wang .................... H04J 11/0069
                                                         370/328
2011/0182224 A1*   7/2011  Ishii ...................... H04W 76/28
                                                         370/311
                    (Continued)

FOREIGN PATENT DOCUMENTS

CN          112153748 A      12/2020
CN          115136657 A       9/2022

OTHER PUBLICATIONS

3rd Generation Partnership Project; Technical Specification Group Radio Access Network; NR; Radio Resource Control (RRC) protocol specification (Release 17), 3GPP TS 38.331 V17.3.0, Dec. 2022, 1318 pages.

*Primary Examiner* — Carolyn R Edwards
*Assistant Examiner* — Maria El-Zoobi
(74) *Attorney, Agent, or Firm* — Nixon & Vanderhye, P.C.

(57) ABSTRACT

Embodiments disclosed herein relate to dynamic methods and systems for reading System Information Block 19 (SIB19) for maintaining Uplink Synchronization (UL Sync) and updated cell information during Non-Terrestrial networks (NTN) connectivity. The methods include a dynamic algorithm to re-acquire SIB19 by considering different factors of UE's current status such as Radio Resource Control (RRC) states (idle/inactive/connected), SI periodicity of SIB19, emergency call status and UL Sync validity timer duration. The methods include monitoring of the UE status periodically and dynamically executing the algorithm to decide the time instance and periodicity to re-acquire SIB-19 based on UE current status. The methods include evaluating the UE condition on each SIB periodicity, and determining the next time period and periodicity to read SIB19.

20 Claims, 15 Drawing Sheets

(51) Int. Cl.
    *H04W 76/27*         (2018.01)
    *H04W 84/06*         (2009.01)

(58) Field of Classification Search
    CPC . H04W 56/002; H04W 92/18; H04W 76/046;
              H04W 52/246; H04W 56/0045; H04W
                      72/0413
    USPC ...................................................... 455/404.1
    See application file for complete search history.

(56) References Cited

U.S. PATENT DOCUMENTS

| | | | |
|---|---|---|---|
| 2014/0086219 A1* | 3/2014 | Suzuki .............. | H04W 56/0005 |
| | | | 370/336 |
| 2015/0319661 A1* | 11/2015 | Jung ................. | H04W 28/0861 |
| | | | 455/436 |
| 2015/0341866 A1* | 11/2015 | Park .......................... | H04L 5/14 |
| | | | 370/280 |
| 2017/0215160 A1* | 7/2017 | Löhr ................... | H04W 56/002 |
| 2017/0367058 A1* | 12/2017 | Pelletier ............ | H04W 72/0446 |
| 2022/0232503 A1* | 7/2022 | Cheng ................. | H04W 56/009 |
| 2022/0330191 A1* | 10/2022 | Shin ...................... | G01S 19/258 |
| 2023/0254851 A1* | 8/2023 | Prasad .............. | H04W 72/1268 |
| | | | 370/316 |

\* cited by examiner

400

500

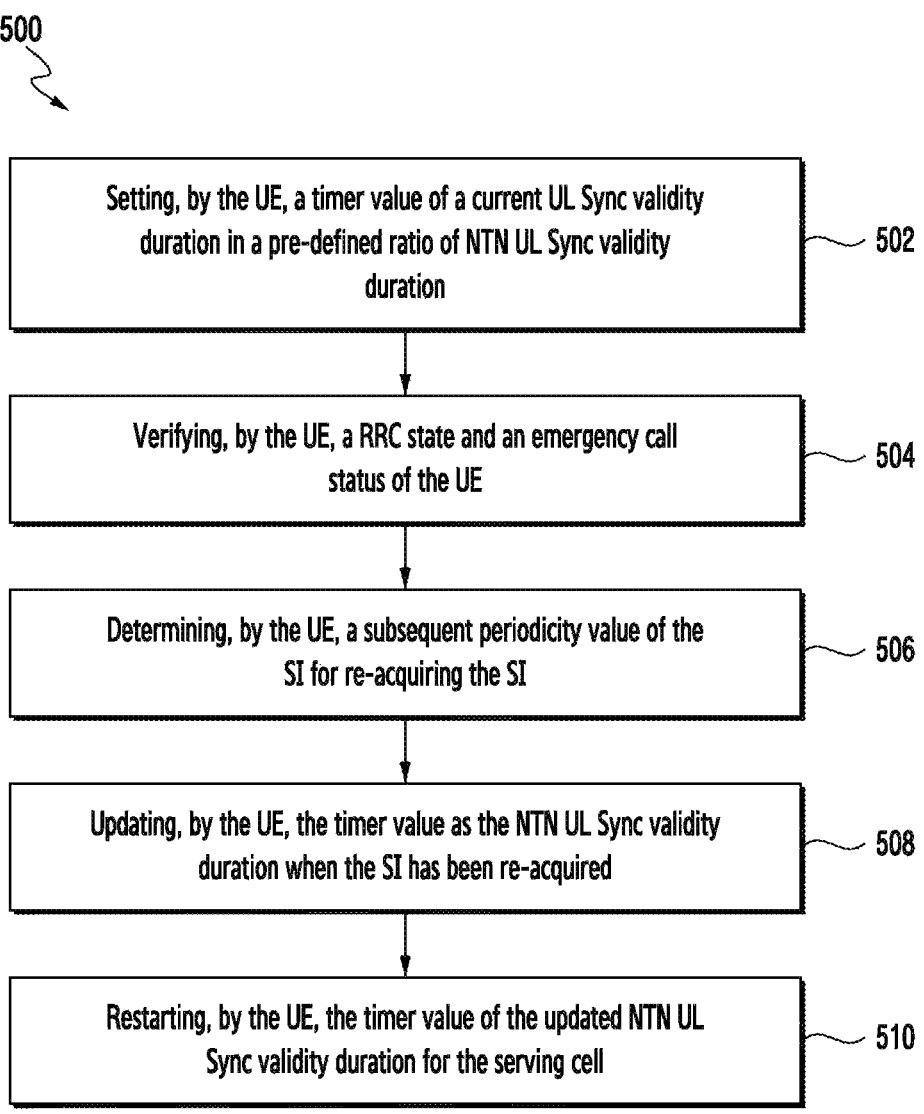

Setting, by the UE, a timer value of a current UL Sync validity duration in a pre-defined ratio of NTN UL Sync validity duration — 502

Verifying, by the UE, a RRC state and an emergency call status of the UE — 504

Determining, by the UE, a subsequent periodicity value of the SI for re-acquiring the SI — 506

Updating, by the UE, the timer value as the NTN UL Sync validity duration when the SI has been re-acquired — 508

Restarting, by the UE, the timer value of the updated NTN UL Sync validity duration for the serving cell — 510

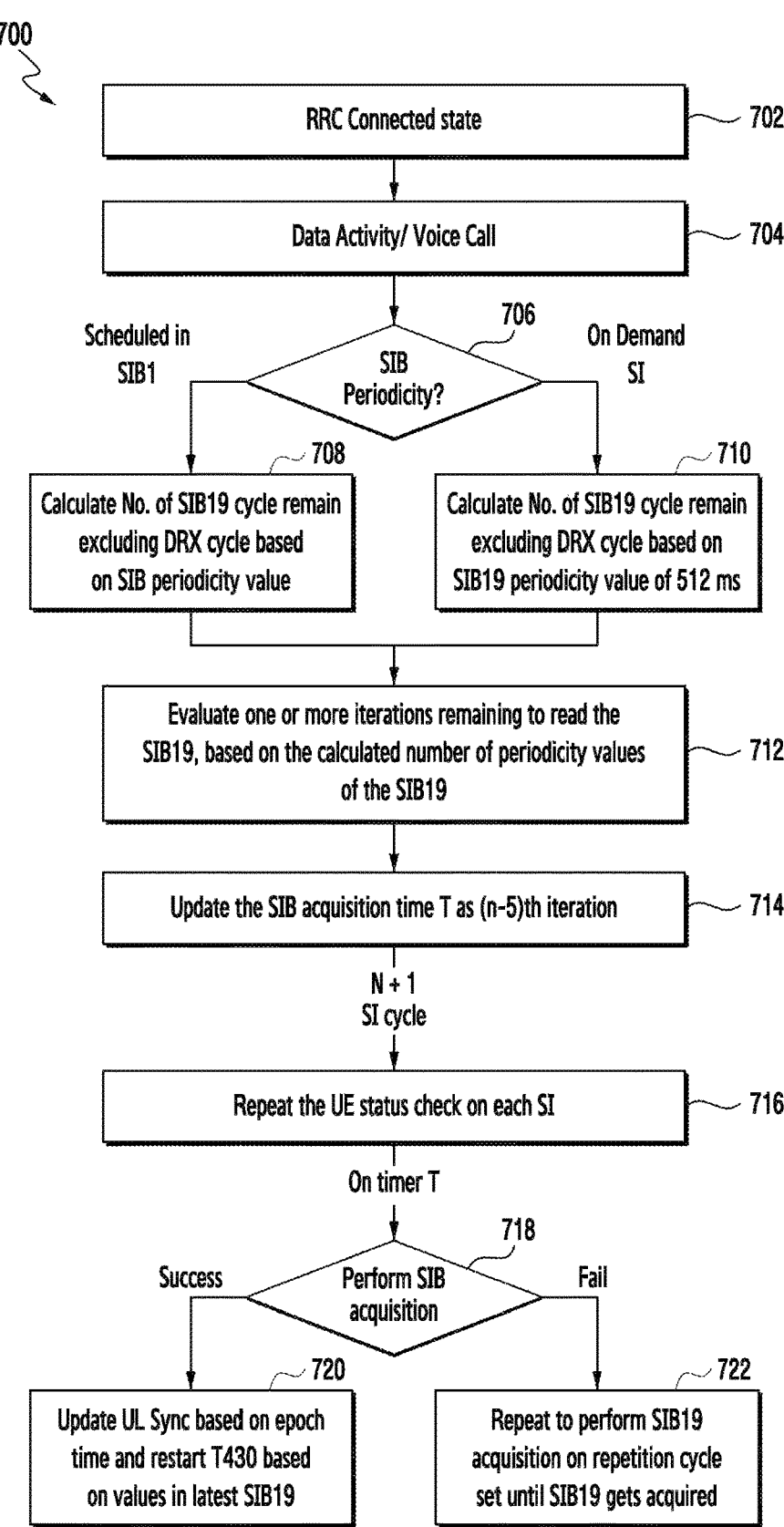

700

702 — RRC Connected state

704 — Data Activity/ Voice Call

706 — SIB Periodicity?

Scheduled in SIB1

On Demand SI

708 — Calculate No. of SIB19 cycle remain excluding DRX cycle based on SIB periodicity value 710 — Calculate No. of SIB19 cycle remain excluding DRX cycle based on SIB19 periodicity value of 512 ms 712 — Evaluate one or more iterations remaining to read the SIB19, based on the calculated number of periodicity values of the SIB19

714 — Update the SIB acquisition time T as (n-5)th iteration

N + 1 SI cycle

716 — Repeat the UE status check on each SI

On timer T

718 — Perform SIB acquisition

Success

Fail

720 — Update UL Sync based on epoch time and restart T430 based on values in latest SIB19

722 — Repeat to perform SIB19 acquisition on repetition cycle set until SIB19 gets acquired

FIG. 7

SYSTEMS AND METHODS FOR MAINTAINING UL SYNCHRONIZATION AND UPDATED CELL INFORMATION DURING NTN CONNECTIVITY

CROSS REFERENCE TO RELATED APPLICATIONS

This application is based on and claims priority under 35 U.S.C. § 119 to Indian Provisional Application No. 202341014949, filed on Mar. 6, 2023, in the Indian Patent Office, and to Indian Complete application Ser. No. 202341014949, filed on Feb. 12, 2024, in the Indian Patent Office, the disclosures of each of which are incorporated by reference herein in their entireties.

BACKGROUND

Field

The disclosure relates to wireless communication networks, and for example, to dynamic methods and systems for reading System Information Block 19 (SIB19) for maintaining Uplink Synchronization (UL Sync) and updated cell information during Non-Terrestrial networks (NTN) connectivity.

Description of Related Art

Following New Radio (NR) technology massive growth, research has started to focus towards the mobile communication service continuity in remote areas such as rural areas, desert, ocean, etc. As a result, Non-Terrestrial Networks (NTN) has been defined in Release 17 of 3rd Generation Partnership Project (3GPP) Specification to improve the coverage challenges of complex use cases where traditional Terrestrial Networks (TN) could not achieve. NTN is an umbrella term for a network that may involve non-terrestrial flying objects which includes satellite communication networks, High Altitude Platform Systems (HAPS), and air-to-ground networks. Changes has been introduced in 3GPP Release 17 specification for a User Equipment (UE) to distinguish NTN networks from traditional TN which is in the form of a new Information Element (IE), System Information Block (SIB) and updates in procedures (for example: Cell selection, Handover, and so on). The updates introduced in Release-17 makes the UE to select the NTN networks when UE couldn't access Terrestrial Network or during mobility between TN and NTN network. As part of Release 17 NTN updates, SIB-19 is introduced which define the satellite assistance information for NTN access to NR cell. The UE needs to acquire SIB-19 to read satellite assistance information to gain access to NTN NR cell. Newly introduced SIB19 carries different information related to NTN satellite cell which are required for camping and remain in service in NTN Cell.

FIG. 1 is a diagram illustrating an example of conventional Non-Terrestrial Networks (NTN). NTNs focus on more than underserved area coverage and following are a few example use cases of NTN Networks:

Service continuity:

Radio Access Technology (RAT) coverage to area where it is unfeasible through Terrestrial Networks (TN) such as in maritime or remote areas.

Supports service continuity between land-based 5th generation (5G) access and satellite-based access networks.

Service ubiquity:

Motivated by Mission-Critical Communications (MCX) and aims at permanent system availability.

Service scalability

Enhancements of traffic steering like offloading of traffic from terrestrial to non-terrestrial communications provide better system efficiency.

5G system backhaul services

NTN connection serves as a backhaul connection to the core network of TN.

SIB19 has been introduced in 3GPP for NTN which contains satellite assistance information for NTN access to NR cell. SIB19 includes reference location, validity time, threshold distance of serving NTN cell, and so on as given below, where the SIB19 defines boundary for a UE to get access to a particular NTN cell. SIB19 further includes NTN-config IE, which carries parameters needed for the UE to access NR via NTN access for current serving cell as given below.

```
-- ASN1START
-- TAG-SIB19-START
SIB 19-r17 ::= SEQUENCE {
    ntn-Config-r17      NTN-Config-r17                       OPTIONAL,   -- Need R
    t-Service-r17       INTEGER(0..549755813887) OPTIONAL, -- Need R
    referenceLocation-r17 ReferenceLocation-r17 OPTIONAL, -- Need R
    distanceThresh-r17            INTEGER(0..65525)       OPTIONAL, -- Need R
    ntn-NeighCellConfigList-r17 NTN-NeighCellConfigList-r17 OPTIONAL, --
Need R
    late NonCriticalExtension               OCTET STRING            OPTIONAL,
    ...,
    [[
    ntn-NeighCellConfigListExt-v1720                        NTN-NeighCellConfigList-r17
OPTIONAL    -- Need R
    ]]
}
NTN-NeighCellConfigList-r17 ::= SEQUENCE (SIZE(1..maxCellNTN-r17)) OF
NTN-NeighCellConfig-r17
NTN-NeighCellConfig-r17 ::=                          SEQUENCE {
    ntn-Config-r17      NTN-Config-r17              OPTIONAL,     -- Need R
    carrierFreq-r17     ARFCN-ValueNR              OPTIONAL,     -- Need R
    physCellId-r17      PhysCellId                 OPTIONAL     -- Need R
}
-- TAG-SIB19-STOP
-- ASN1STOP
```

Table 1 illustrates an example of information elements in SIB19.

TABLE 1

| Information Element | Description |
|---|---|
| ntn-Config | Parameters needed for UE to access NR via NTN, such as Ephemeris data, common TA parameters, k_offset, validity duration for Uplink Synchronization (UL Sync) information and epoch |
| t-Service | Indicates the time information on when a cell provided via NTN quasi-Earth fixed system is going to stop serving the area it is currently covering |
| ntn-NeighCellConfigList | Provides a list of NTN neighbour cells including their ntn-Config, carrier frequency and PhysCellId |
| referenceLocation | Reference location of the serving cell provided via NTN quasi-Earth fixed system and is used in location-based measurement initiation in RRC_IDLE and RRC_INACTIVE |
| distancethreshold | Distance from the serving cell reference location and is used in location-based measurement initiation in RRC_IDLE and RRC_INACTIVE. Each step represents 50 m |

The NTN configuration IE in SIB19 includes satellite ephemeris information, uplink synchronization sub frame and validity duration of SIB19 information, as given below:

```
-- ASN1START
-- TAG-NTN-CONFIG-START
NTN-Config-r17 ::=                SEQUENCE {
    epochTime-r17    EpochTime-r17              OPTIONAL,    -- Need R
    ntn-UlSyncValidityDuration-r17    ENUMERATED{ s5, s10, s15, s20, s25, s30,
s35, s40, s45, s50, s55, s60, s120, s180, s240, s900} OPTIONAL,    -- Cond SIB19
    cellSpecificKoffset-r17           INTEGER(1..1023) OPTIONAL,        -- Need R
    kmac-r17             INTEGER(1..512)        OPTIONAL,      -- Need R
    ta-Info-r17         TA-Info-r17            OPTIONAL,      -- Need R
    ntn-PolarizationDL-r17          ENUMERATED {rhcp,lhcp,linear}       OPTIONAL,
        -- Need R
    ntn-PolarizationUL-r17          ENUMERATED              {rhcp,lhcp,linear}
        OPTIONAL,    -- Need R
    ephemerisInfo-r17       EphemerisInfo-r17      OPTIONAL,    -- Need R
    ta-Report-r17     ENUMERATED {enabled}            OPTIONAL, -- Need R
    ...
}
EpochTime-r17 ::=            SEQUENCE {
    sfn-r17                   INTEGER(0..1023),
    subFrameNR-r17            INTEGER(0..9)
}
Ta-Info-r17             SEQUENCE {
    ta-Common-r17                INTEGER(0..66485757),
    ta-CommonDrift-r17          INTEGER(-257303..257303)        OPTIONAL,
        -- Need R?
    ta-CommonDriftVariant-r17        INTEGER(0..28949)        OPTIONAL
-- Need R
}
-- TAG-NTN-CONFIG-STOP
-- ASN1STOP
```

Table 2 illustrates an example of NTN configuration IE.

TABLE 2

| Information Element | Description |
|---|---|
| EphemerisInfo | Provides satellite ephemeris either in format of position and velocity state vector or in format of orbital parameters |
| epochTime | Starting time of a DL sub-frame, indicated by System Frame Number (SFN) and sub-frame number signalled together with assistance information. |

TABLE 2-continued

| Information Element | Description |
|---|---|
| ntn-UlSyncValidityDuration | Reference point for epoch time of the serving satellite ephemeris and Common TA parameters is the uplink time synchronization reference point Validity duration configured by the network for assistance information (i.e. Serving and/or neighbour satellite ephemeris and Common TA parameters) which indicates the maximum time during which the UE can apply assistance information without having acquired new assistance information. The unit of ntn-UlSyncValidityDuration is second. Value s5 corresponds to 5 s, value s10 indicate 10 s and so on. This parameter applies to both connected and idle mode UEs. If this field is absent in ntn-Config provided via NTN-NeighCellConfig, the UE uses validity duration from the serving cell assistance information. This field is excluded when determining changes in system information, i.e. changes of ntn-UlSyncValidityDuration should neither result in system information change notifications nor in a modification of valueTag in SIB1. ntn-UlSyncValidityDuration is only updated when at least one of epochTime, ta-Info, ephemerisInfo is updated. |

TABLE 2-continued

| Information Element | Description |
|---|---|
| kmac | Scheduling offset provided by network if downlink and uplink frame timing are not aligned at gNB. Needed for UE action and assumption on downlink configuration indicated by a Medium Access Control (MAC) Control Element (CE) command in PDSCH (Physical Downlink Shared Channel) |

5

TABLE 2-continued

| Information Element | Description |
|---|---|
| ta-Report | Indicates reporting of timing advanced is enabled during Random Access due to RRC connection establishment or RRC connection resume, and during RRC connection reestablishment |
| ntn-PolarizationDL/ ntn-PolarizationUL | Indicates Polarization information for Downlink/Uplink service link |

On Acquisition of SIB-19, UE will decode NTN-config IE and will perform UL synchronization with reference to sub-frame received in epochtime and starts T430 timer with value of ntn-UlSyncValidityDuration. Information received on SIB 19 becomes invalid after T430 timer expiry as per 3GPP specification TS 38.331 and so UE need to re-acquire SIB 19 of the serving cell before T430 timer expiry to maintain service with current serving cell. UE will lose UL Synchronization which results in data loss and service discontinuity on failing to acquire SIB 19 before T430 expiry during RRC Connected Mode. In 3GPP. T430 timer starts or restarts from the subframe indicated by epochTime upon reception of SIB19. The term 'T430 imter' may be referred as a sync timer, uplink sync timer, validaty time, uplink synchronization validation timer, and/or any other tems that have equviante technical meaning.

In the existing solution, 3GPP does not define any standard mechanism and periodicity to read SIB19 before T430 expires and it is up to the UE implementation to re-acquire SIB19 before T430 expiry as per 3GPP specification 38.331. Example of SIB19 acquisition is given below.

Actions upon reception of SIB19:
Upon receiving SIB19, the UE shall:
   1> start or restart T430 for serving cell with the timer value set to ntn-UlSync ValidityDuration from the subframe indicated by epochTime;
      NOTE: UE should attempt to re-acquire SIB19 before the end of the duration indicated by ntn-UlSync ValidityDuration and epochTime by UE implementation.

T430 expiry:
The UE shall:
   1> if T430 for serving cell expires and if in RRC_CONNECTED:
      2> inform lower layers that UL synchronisation is lost;
      2> acquire SIB 19;
      2> upon successful acquisition of SIB 19:
         3> inform lower layers that UL synchronisation is obtained.

For example, as ntn-UlSync ValidityDuration value ranges from 5 seconds to 900 seconds, reading the SIB19 using a static method may lead to SIB19 read failure and UL Synchronization loss.

FIG. 2 is a flowchart illustrating a conventional method for re-acquiring SIB19. The method includes camping, by a UE, on to a NTN cell, as depicted in step 202. Subsequently, the UE reads SIB19 and retrieves NTN UL Sync validity timer, as depicted in step 204. The UE starts T340 timer, as depicted in step 206. However, no standard method is defined for time instance to re-acquire SIB19 and it is UE implementation as per 3GPP, as depicted in step 208. Therefore, same static method is used in all scenarios, as depicted in step 210.

FIG. 3A is a diagram illustrating a conventional static method of SIB19 read near T430 timer expiry, in a scenario of UE in RRC connected state and emergency call inactive. Assume that the UE sets the static method of reading SIB19 value near to T430 timer expiry (for example, 1 second) and consider the scenario of UE is in the RRC connected state and data connection is ongoing. The UE acquires SIB19 during cell camp on and T430 timer gets started. There can be a possibility that SIB19 periodicity can be of 512 milliseconds (ms) (for example, maximum value of SIB19 periodicity as per specification). In case of UE sets the static method of SIB19 read as 1 second before T430 expiry, there can be chance that UE gets only one SI cycle to read the SIB-19 T430 expiry in case of SIB periodicity is 512 ms. If UE fails to re-acquire SIB19 in last SI cycle, then all information present already for existing SIB19 becomes invalid and UL synchronization may lost and data loss can occur. This leads to data connection discontinuity which affects user experience and therefore using the static method of reading SIB19 near to T430 expiry is not a vital solution and affect service continuity.

FIG. 3B is a diagram illustrating a conventional static method of SIB19 read as "n" minutes before T340 expiry, in a scenario of UE in RRC idle status. Assume that the UE sets the static method of reading SIB19 value as (ntn-ulsync validity duration-n) minutes value. The UE acquires SIB19 during cell camp on and T430 timer gets started, and considers the scenario of UE is in RRC idle. ntn-ulsyncvalidity duration timer ranges up to the maximum value of 15 minutes (corresponding to 900 seconds) and SIB19 periodicity can start from value of 8 ms. In case of UE sets static method of SIB19 read as (ntn-ulsync validity duration timer-n) value, the UE re-acquires SIB19 again before "n" minutes. In case, static method value set "n" as 2 minutes, the UE re-acquires 2 minutes before the T430 expiry. As UE is in idle state and no data connection ongoing, the UE reads SIB-19 with long gap before T430 expiry leads to wastage of network resources. This leads the UE to update the UL synchronization again and restart the timer value, which leads to UE does it repeatedly though network provides enough gap to read SIB-19. This static method fails to utilize the gap provided by the network to read SIB19 and uses the network resources unnecessarily. As value of SIB19 validity ranges from 5 seconds to 15 minutes, setting "n" value same in all cases is not feasible.

FIG. 3C is a diagram illustrating a conventional static method of SIB19 read near T430 timer expiry, in a scenario of UE in emergency call active in NTN cell. Assume that the UE sets the static method of reading SIB19 value near to T430 timer expiry (for example, 1 second) and consider the scenario of emergency call active in UE. The UE acquires SIB19 during cell camp on and T430 timer gets started. The T430 timer value can range from 5 seconds. There can be a possibility that SIB19 periodicity can be of 512 ms (for example, maximum value of SIB19 periodicity as per specification). If the UE sets the static method of SIB19 read as 1 second before T430 expiry, then there can be a chance that UE gets only one SI cycle to read the SIB-19 T430 expiry in case of SIB periodicity is 512 ms. If the UE fails to re-acquire SIB19 in last SI cycle, then all information present already for existing SIB19 becomes invalid and UL synchronization may lost and emergency call gets disconnected. This leads to emergency call discontinuity which affects user experience. Therefore, using the static method of reading SIB19 near to T430 expiry is not an vital solution and may affect service continuity.

Thus, there is no method provided for time instance and to re-acquire SIB19 during T430 timer. Defining the same static method without considering the UE ongoing status may lead to SIB acquisition failure.

Hence, there is a need for solutions which will address the above mentioned drawback(s), among others.

SUMMARY

Embodiments of the disclosure may provide dynamic methods and systems for reading System Information Block 19 (SIB19) for maintaining Uplink Synchronization (UL Sync) and updated cell information during Non-Terrestrial networks (NTN) connectivity.

Embodiments of the disclosure may provide a dynamic algorithm to re-acquire SIB19 by considering different factors of UE's current status such as Radio Resource Control (RRC) states (idle/inactive/connected), SI periodicity of SIB19, emergency call status and UL Sync validity timer duration.

Embodiments of the disclosure may provide dynamic methods and systems to monitor the UE status periodically and dynamically execute the algorithm to decide the time instance and periodicity to re-acquire SIB-19 based on UE current status.

Embodiments of the disclosure may provide a dynamic algorithm to evaluate the UE condition on each SIB periodicity and determine the next time period and periodicity to read SIB19 based on RRC State, SI periodicity, emergency call status and T340 timer value.

embodiments of the disclosure may provide dynamic methods and systems to acquire SIB19 of current serving cell in all possible situations in optimistic way and thus maintain service continuity with NTN Cell which enhances user experience.

Accordingly, example embodiments herein provide a method for Uplink Synchronization (UL Sync) during Non-Terrestrial networks (NTN) connectivity. The method comprises: setting, by a User Equipment (UE), a timer value of a current UL Sync validity duration in a specified ratio of a NTN UL Sync validity duration, based on a System Information (SI) of a serving cell being acquired and an NTN UL Sync validity duration being started; verifying, by the UE, a Radio Resource Control (RRC) state and an emergency call status of the UE, based on expiry of the set timer value of the current UL Sync validity duration; determining, by the UE, a subsequent periodicity value of the SI for re-acquiring the SI, based on the RRC state and the emergency call status of the UE; updating, by the UE, the timer value as the NTN UL Sync validity duration based on the SI being re-acquired, before the expiry of a time-lapse of the NTN UL Sync validity duration; and restarting, by the UE, the timer value of the updated NTN UL Sync validity duration for the serving cell.

Accordingly, example embodiments herein provide a user equipment (UE) comprising: a memory and at least one processor, comprising processing circuitry, at least one processor, individually and/or collectively, is configured to: set a timer value of a current UL Sync validity duration in a specified ratio of an NTN UL Sync validity duration, based on a SI of a serving cell being acquired and an NTN UL Sync validity duration being started; verify a RRC state and an emergency call status of the UE, based on expiry of the set timer value of the current UL Sync validity duration; determine a subsequent periodicity value of the SI for re-acquiring the SI, based on the RRC state and the emergency call status of the UE; update the timer value as the NTN UL Sync validity duration based on the SI being re-acquired, before the expiry of a time-lapse of the NTN UL Sync validity duration; and restart the timer value of the updated NTN UL Sync validity duration for the serving cell.

Accordingly, example embodiments herein provide a method for UL Sync during NTN connectivity. The method comprises: determining, by a UE, a subsequent periodicity value of a SI of a serving cell to re-acquire the SI, based on a plurality of parameters and a plurality of states; and updating, by the UE, a timer value as an NTN UL Sync validity duration based on the SI being re-acquired, before the expiry of a time-lapse of the NTN UL Sync validity duration, based on the determined subsequent periodicity value of the SI.

Accordingly, example embodiments herein provide a UE comprising: a memory and at least one processor, comprising processing circuitry, at least one processor, individually and/or collectively, is configured to: determine a subsequent periodicity value of a SI to re-acquire the SI, based on a plurality of parameters and a plurality of states; and update, a timer value as an NTN UL Sync validity duration based on the SI being re-acquired, before the expiry of a time-lapse of the NTN UL Sync validity duration, based on the determined subsequent periodicity value of the SI.

Accordingly, example embodiments herein provide a user equipment (UE) for an uplink synchronization (UL Sync) during non-terrestrial networks (NTN) connectivity. The method comprises, based on acquiring system information (SI) of a serving cell that indicates an NTN UL Sync validity duration, setting, by the UE, a value of a UL Sync timer to the NTN UL Sync validity duration and a value of an acquisition timer to a specified ratio of the NTN UL Sync validity duration. The method comprises verifying, by the UE, a radio resource control (RRC) state and a call status of the UE based on expiry of the acquisition timer while the UL Sync timer is running. The method comprises determining, by the UE, a subsequent periodicity for re-acquiring the SI, based on the RRC state and the call status of the UE. The method comprises, based on re-acquiring the SI of the serving cell, that indicates a new NTN UL Sync validity duration, in accordance with the subsequent periodicity, updating, by the UE, the value of the UL Sync timer as the new NTN UL Sync validity duration for the serving cell before an expiry of a time-lapse of the NTN UL Sync validity duration. The method comprises restarting, by the UE, the UL Sync timer with the updated value of the UL Sync timer.

Accordingly, example embodiments herein provide a user equipment (UE) for an uplink synchronization (UL Sync) during non-terrestrial networks (NTN) connectivity. The UE comprises at least one processor, comprising processing circuitry. The UE comprises memory, comprising one or more storage mediums, storing instructions that, when executed by the at least one processor individually and/or collectively, cause the UE to, based on acquiring system information (SI) of a serving cell that indicates an NTN UL Sync validity duration, set a value of a UL Sync timer to the NTN UL Sync validity duration and a value of an acquisition timer to a specified ratio of the NTN UL Sync validity duration, verify a radio resource control (RRC) state and a call status of the UE based on expiry of the acquisition timer while the UL Sync timer is running, determine a subsequent periodicity for re-acquiring the SI, based on the RRC state and the call status of the UE, based on re-acquiring the SI of the serving cell, that indicates a new NTN UL Sync validity duration, in accordance with the subsequent periodicity, update the value of the UL Sync timer as the new NTN UL Sync validity duration for the serving cell before an expiry of a time-lapse of the NTN UL Sync validity duration, and restart the UL Sync timer with the updated value of the UL Sync timer.

Accordingly, example embodiments herein provide a non-transitory computer readable storage medium storing instructions that, when executed by at least one processor individually and/or collectively, cause a user equipment (UE) for an uplink synchronization (UL Sync) during non-terrestrial networks (NTN) connectivity to, based on acquiring system information (SI) of a serving cell that indicates an NTN UL Sync validity duration, set a value of a UL Sync timer to the NTN UL Sync validity duration and a value of an acquisition timer to a specified ratio of the NTN UL Sync validity duration, verify a radio resource control (RRC) state and a call status of the UE based on expiry of the acquisition timer while the UL Sync timer is running, determine a subsequent periodicity for re-acquiring the SI, based on the RRC state and the call status of the UE, based on re-acquiring the SI of the serving cell, that indicates a new NTN UL Sync validity duration, in accordance with the subsequent periodicity, update the value of the UL Sync timer as the new NTN UL Sync validity duration for the serving cell before an expiry of a time-lapse of the NTN UL Sync validity duration, and restart the UL Sync timer with the updated value of the UL Sync timer.

These and other aspects of various example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the disclosure herein without departing from the spirit thereof, and the example embodiments herein include all such modifications.

BRIEF DESCRIPTION OF THE DRAWINGS

Embodiments herein are illustrated in the accompanying drawings, throughout which like reference letters indicate corresponding parts in the various figures. and the above and other aspects, features and advantages of certain embodiments of the present disclosure will be more apparent from the following detailed description, taken in conjunction with the accompanying drawings, in which:

FIG. 5 is a flowchart illustrating an example method for UL Sync during NTN connectivity, according to various embodiments;

FIG. 7 is a flowchart illustrating an example method for re-acquiring SIB for UL Sync during NTN connectivity if the RRC state is the RRC connected state, according to various embodiments;

DETAILED DESCRIPTION

Figure 1:
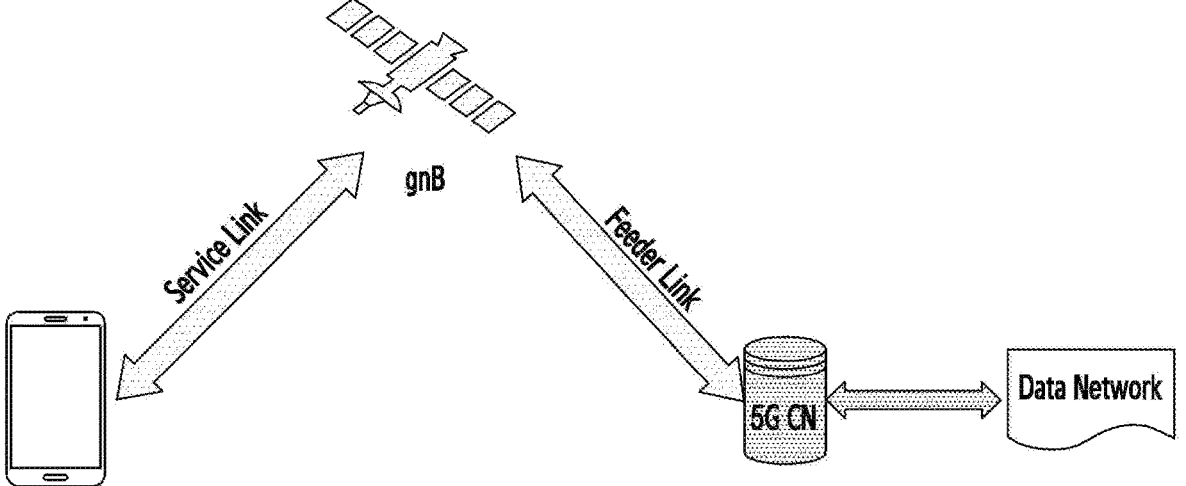
FIG. 1 is a diagram illustrating an example of a Non-Terrestrial Networks (NTN), according to the prior art.
Figure 2:
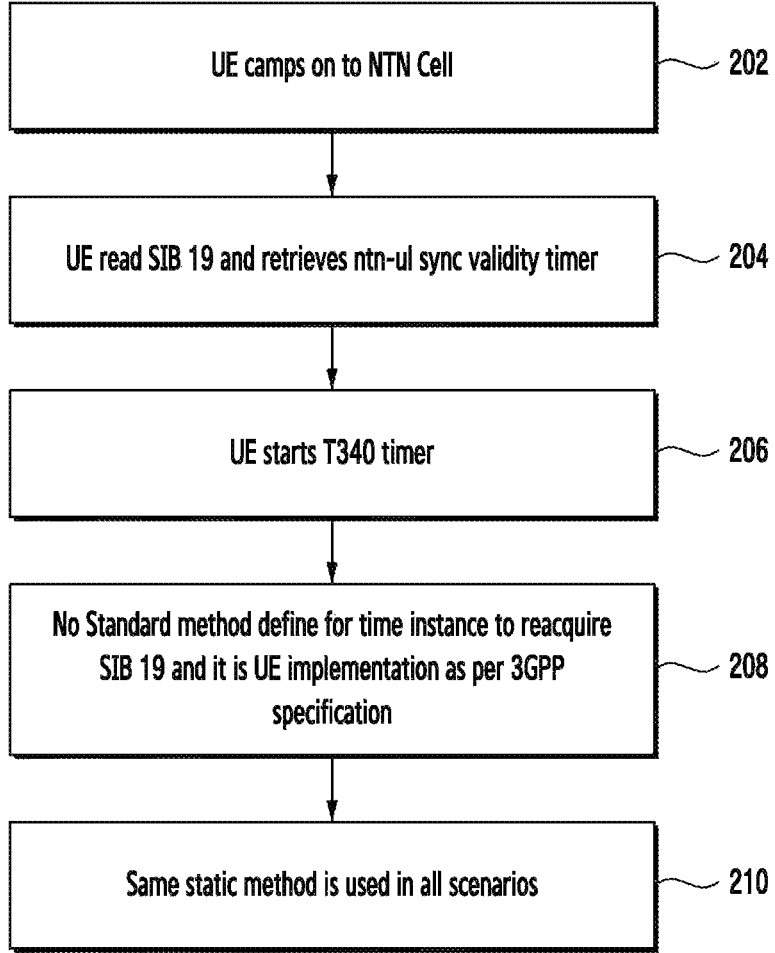
FIG. 2 is a diagram illustrating a method for re-acquiring System Information Block 19 (SIB19), according to the prior art.
Figure 3A:
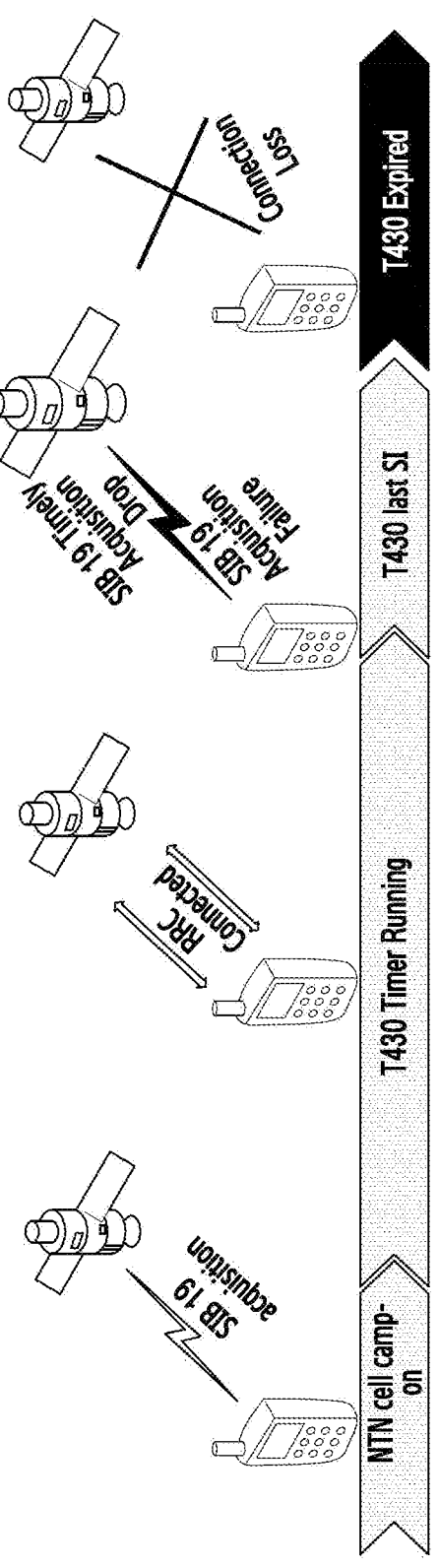
FIG. 3A is a diagram illustrating a static method of SIB19 read near T430 timer expiry, in a scenario of UE in RRC connected state and emergency call inactive, according to the prior art.
Figure 3B:
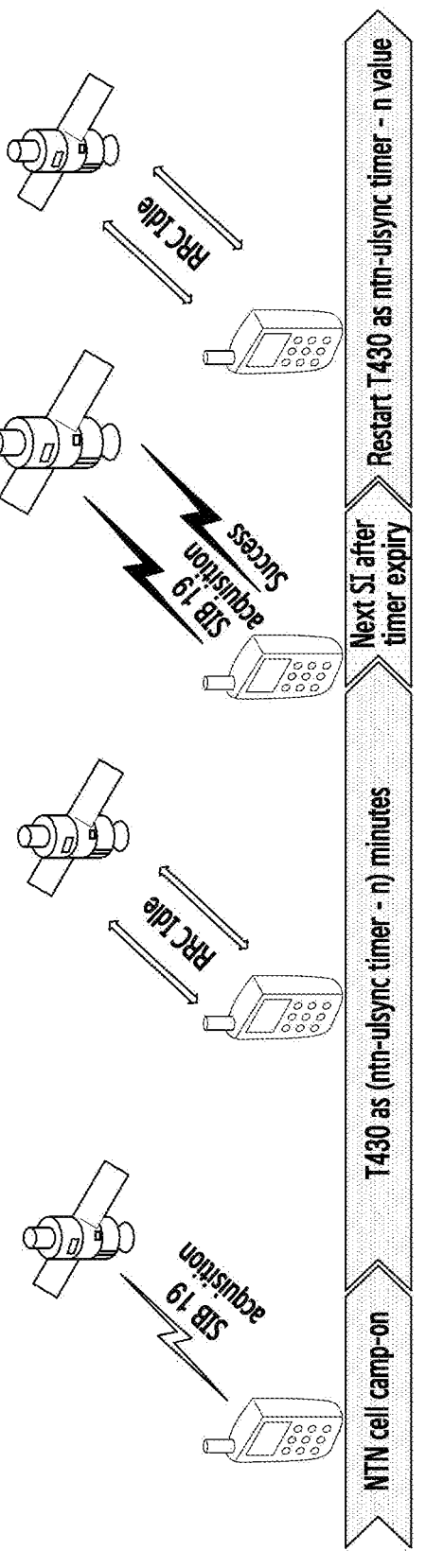
FIG. 3B is a diagram illustrating a static method of SIB19 read as "n" minutes before T340 expiry, in a scenario of UE in RRC idle status, according to the prior art.
Figure 3C:
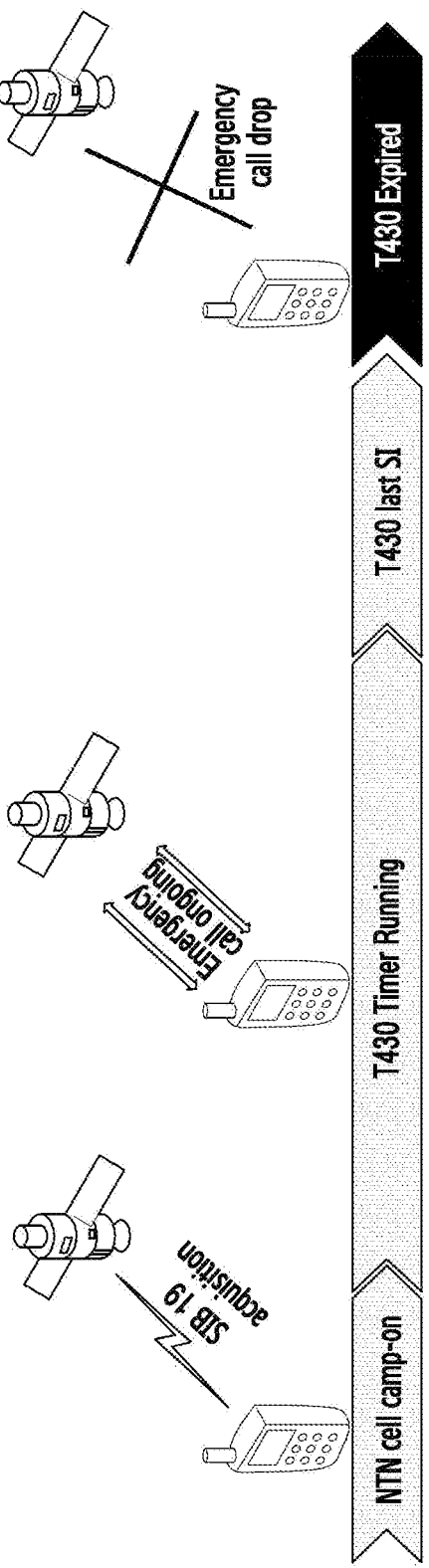
FIG. 3C is a diagram illustrating a static method of SIB19 read near T430 timer expiry, in a scenario of UE in emergency call active in NTN cell, according to the prior art.

The various example embodiments herein and the various features and advantageous details thereof are explained more fully with reference to the non-limiting embodiments that are illustrated in the accompanying drawings and detailed in the following description. Descriptions of well-known components and processing techniques may be omitted so as to not unnecessarily obscure the embodiments herein. The examples used herein are intended merely to facilitate an understanding of ways in which the embodiments herein may be practiced. Accordingly, the examples should not be construed as limiting the scope of the disclosure.

For the purposes of interpreting this disclosure, the definitions (as defined herein) will apply and whenever appropriate the terms used in singular will also include the plural and vice versa. It is to be understood that the terminology used herein is for the purposes of describing various embodiments and is not intended to be limiting. The terms "comprising", "having" and "including" are to be construed as open-ended terms unless otherwise noted.

The words/phrases "exemplary", "example", "illustration", "in an instance", "and the like", "and so on", "etc.", "etcetera", "e.g.,", "i.e.," are merely used herein to refer, for example, to "serving as an example, instance, or illustration." Any embodiment or implementation of the present subject matter described herein using the words/phrases "exemplary", "example", "illustration", "in an instance", "and the like", "and so on", "etc.", "etcetera", "e.g.,", "i.e.," is not necessarily to be construed as preferred or advantageous over various embodiments.

Embodiments herein may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by a firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

It should be noted that elements in the drawings are illustrated for the purposes of this description and ease of understanding and may not have necessarily been drawn to scale. For example, the flowcharts/sequence diagrams illustrate the method in terms of steps for understanding of aspects of the embodiments as disclosed herein. Furthermore, in terms of the construction of the device, one or more components of the device may have been represented in the drawings by conventional symbols, and the drawings may show those specific details that are pertinent to understanding the various embodiments so as not to obscure the drawings with details that will be readily apparent to those of ordinary skill in the art having the benefit of the description herein. Furthermore, in terms of the system, one or more components/modules which comprise the system may have been represented in the drawings by conventional symbols, and the drawings may show those specific details that are pertinent to understanding the various embodiments so as not to obscure the drawings with details that will be readily apparent to those of ordinary skill in the art having the benefit of the description herein.

The accompanying drawings are used to help easily understand various technical features and it should be understood that the embodiments presented herein are not limited by the accompanying drawings. As such, the present disclosure should be construed to extend to any modifications, equivalents, and substitutes in addition to those which are particularly set out in the accompanying drawings and the corresponding description. Usage of words such as first, second, third etc., to describe components/elements/steps is for the purposes of this description and should not be construed as sequential ordering/placement/occurrence unless specified otherwise.

Various embodiments herein disclose dynamic methods and systems to read System Information Block 19 (SIB19) to maintain Uplink Synchronization (UL Sync) and updated cell information during Non-Terrestrial networks (NTN) connectivity. Referring now to the drawings, and more particularly to FIGS. 4 through 13, where similar reference characters denote corresponding features throughout the figures, there are shown various example embodiments.

Figure 4:
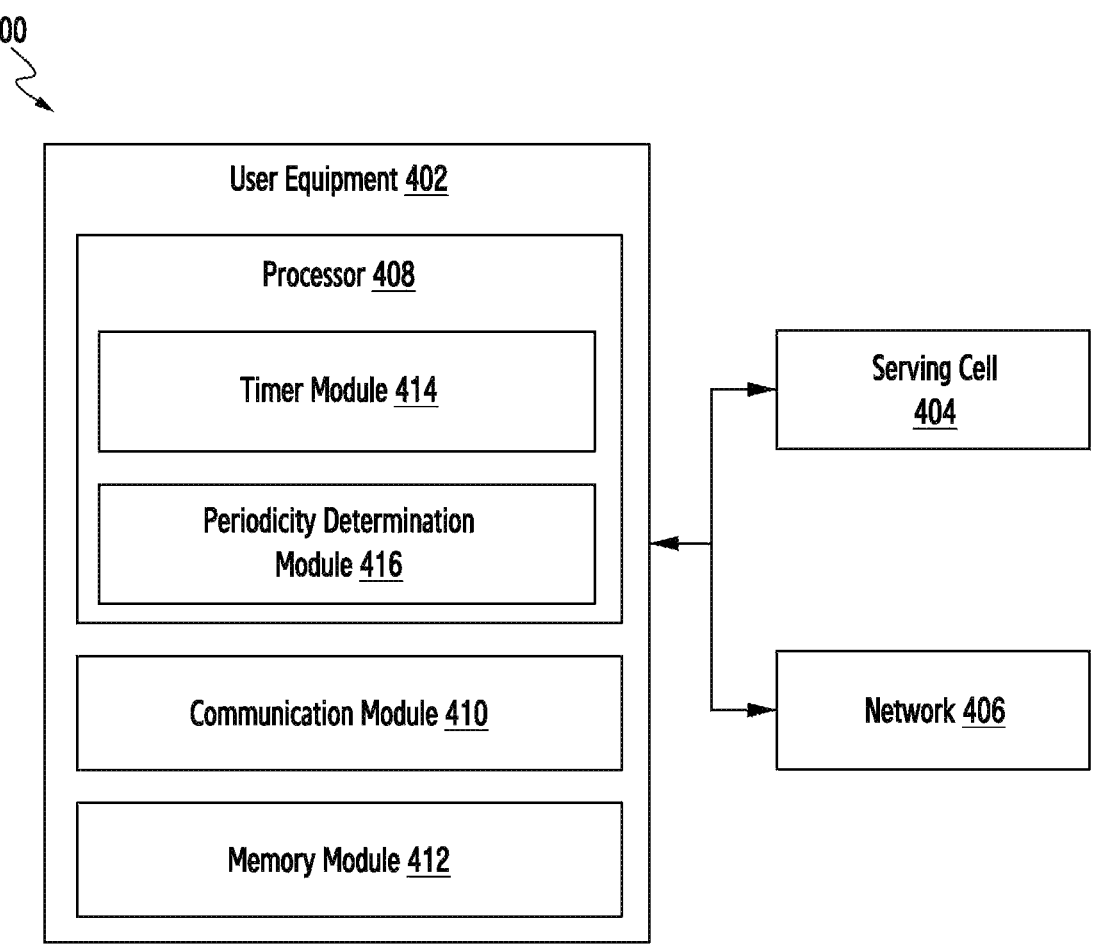
FIG. 4 is a block diagram illustrating an example configuration of a system for UL Sync during NTN connectivity, according to various embodiments.

FIG. 4 is a block diagram illustrating an example configuration of a system 400 for UL Sync during NTN connectivity. The system 400 comprises a User Equipment (UE) 402, serving cell 404 for NTN connectivity, and a network 406. The system 400 is configured to aid the UE 402 to acquire SIB19 of current serving cell 404 in various situations in an optimistic way and maintain service continuity. The UE 402 further comprises a processor (e.g., including processing circuitry) 408, a communication module (e.g., including communication circuitry) 410, and a memory module (e.g., including a memory) 412.

In an embodiment herein, the processor 408 can generate a dynamic algorithm for evaluating the UE condition on each SIB periodicity and determining the next time period and periodicity to read SIB19. The processor 408 further comprises a timer module (e.g., including various circuitry and/or executable program instructions) 414 and a periodicity determination module (e.g., including various circuitry and/or executable program instructions) 416. The processor 408 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

In an embodiment herein, the timer module 414 can set a timer value of a current UL Sync validity duration in a pre-defined ratio of NTN UL Sync validity duration (T430). The timer module 414 can set the timer value, once a System Information (SI) of a serving cell 404 is acquired and NTN UL Sync validity duration (T430) is started. The SI of the serving cell 404 comprises SIB19. The timer module 414 can set the timer value of the current UL Sync validity duration as half of the NTN UL Sync validity duration (T430).

In an embodiment herein, the timer module 414 can receive a subsequent periodicity value of the SI for re-acquiring the SI and update the timer value as the NTN UL Sync validity duration (T430) when the SI has been re-acquired, before the expiry of a time-lapse of the NTN UL Sync validity duration (T430). In an embodiment herein, the timer module 414 can restart the timer value of the updated NTN UL Sync validity duration (T430) for the serving cell 404. In an embodiment herein, the timer module 414 can receive and update the timer value as the NTN UL Sync validity duration (T430) when the SIB19 has been re-acquired, before the expiry of the time-lapse of the NTN UL Sync validity duration (T430).

In an embodiment herein, the periodicity determination module 416 can verify a Radio Resource Control (RRC) state and an emergency call status of the UE 402, on expiry of the set timer value of the current UL Sync validity duration. The periodicity determination module 416 can determine a subsequent periodicity value of the SI of a serving cell 404 for re-acquiring the SI, based on a plurality of parameters and a plurality of states. The parameters can be, but not limited to a current UL Sync validity duration, the NTN UL Sync validity duration (T430), ephemeris data, common Timing Advance (TA) parameters, k_offset, and validity duration for UL sync information and epoch. The states can be, but not limited to a RRC state, an emergency call status of the UE 402, and a periodicity value of the SI. The periodicity determination module 416 can determine a subsequent periodicity value of the SI of a serving cell 404 for re-acquiring the SI, based on the RRC state and the emergency call status of the UE 402. The periodicity determination module 416 can send the determined subsequent periodicity value to the timer module 414, when the SI has been re-acquired.

In an embodiment herein, the periodicity determination module 416 can verify a periodicity value of the SIB19, if the RRC state is a RRC connected state and a current status of the UE 402 is data activity or a voice call and emergency call is not ongoing. The periodicity determination module 416 can calculate a number of periodicity values of the SIB19 remaining in the current UL Sync validity duration (T430) time period, based on the periodicity value of the SIB19 as broadcasted by the network 406 in SIB1. The periodicity determination module 416 can calculate a number of periodicity values of the SIB19 remaining in the current UL Sync validity duration (T430) time period, based on a maximum value of the periodicity value of the SIB19, if the periodicity value of the SIB19 indicates as an on-demand SIB. The periodicity determination module 416 can evaluate one or more iterations remaining to read the SIB19, based on the calculated number of periodicity values of the SIB19 remaining in the current UL Sync validity duration (T430) time period. The periodicity determination module 416 can update an SIB19 reading cycle as appropriate iteration which is higher than iteration determined for a RRC idle state scenario from the evaluated one or more iterations. The periodicity determination module 416 can determine the subsequent periodicity value of the SIB19, based on the updated SIB19 reading cycle to re-acquire the SIB19.

In an embodiment herein, the periodicity determination module 416 can verify a periodicity value of the SIB19, if the RRC state is the RRC connected state and the current status of the UE 402 is emergency call ongoing. The periodicity determination module 416 can determine the subsequent periodicity value of the SIB19 as the SIB19 reading cycle for re-acquiring the SIB19, based on the periodicity value of the SIB19 as broadcasted by the network 406 in SIB1. The periodicity determination module 416 can read the SIB19 on each iteration of the determined subsequent periodicity value of the SIB19, until the SIB19 has acquired. The periodicity determination module 416 can determine a current periodicity value of the SIB19 as the SIB19 reading cycle for re-acquiring the SIB19, based on a maximum value of the periodicity value of the SIB19, if the periodicity value of the SIB19 indicates as an on-demand SIB. The periodicity determination module 416 can read the SIB19 immediately through the on-demand SIB and repeat reading, until the SIB19 has acquired.

In an embodiment herein, the periodicity determination module 416 can verify a periodicity value of the SIB19, if the RRC state is the RRC idle state. The periodicity determination module 416 can calculate a number of periodicity values of the SIB19 remaining in the current UL Sync validity duration (T430) time period, based on the periodicity value of the SIB19 as broadcasted by the network 406 in SIB1. The periodicity determination module 416 can calculate a number of periodicity values of the SIB19 remaining in the current UL Sync validity duration (T430) time period, based on a maximum value of the periodicity value of the SIB19, if the periodicity value of the SIB19 indicates as an on-demand SIB. The periodicity determination module 416 can evaluate one or more iterations remaining to read the SIB19, based on the calculated number of periodicity values of the SIB19 remaining in the current UL Sync validity duration (T430) time period. The periodicity determination module 416 can update an SIB19 reading cycle on appropriate iteration which is lesser than iteration determined for the RRC connected state scenario from the evaluated one or more iterations. The periodicity determination module 416 can determine the subsequent periodicity value of the SIB19, based on the updated SIB19 reading cycle to re-acquire the SIB19.

In an embodiment herein, the periodicity determination module 416 can monitor the emergency call status of the UE 402 on each periodicity value of the SIB19. The periodicity determination module 416 can read the SIB19, based on the updated SIB19 reading cycle on the appropriate iteration which is higher than iteration determined for the RRC idle state scenario, if the RRC state is a RRC connected state and the current status of the UE 402 is data activity or voice call and emergency call is not ongoing, for re-acquiring the SIB19 in a current serving cell 404. The periodicity determination module 416 can read the SIB19 on each iteration of the determined subsequent periodicity value of the SIB19 or immediately through the on-demand SIB, and repeat reading until the SIB19 has acquired, if the RRC state is the RRC connected state and the emergency call is ongoing, for re-acquiring the SIB19 in the current serving cell 404. The periodicity determination module 416 can read the SIB19, based on the updated SIB19 reading cycle on the appropriate iteration which is lesser than iteration determined for the RRC connected state scenario, if the RRC state is the RRC idle state, for re-acquiring the SIB19 in the current serving cell 404. The periodicity determination module 416 can read the SIB19 on each periodicity value of the SIB19, until the SIB19 has acquired. The periodicity determination module 416 can indicate to the timer module 414, the timer value when the SIB19 has been re-acquired, for updating the timer value as the NTN UL Sync validity duration (T430) before the expiry of the time-lapse of the NTN UL Sync validity duration (T430).

In an embodiment herein, the processor 408 can process and execute data of a plurality of modules of the UE 402. The processor 408 can be configured to execute instructions stored in the memory module 412. The processor 408 may comprise one or more of microprocessors, circuits, and other hardware configured for processing. The processor 408 can be at least one of a single processer, a plurality of processors, multiple homogeneous or heterogeneous cores, multiple Central Processing Units (CPUs) of different kinds, micro-controllers, special media, and other accelerators. The processor 408 may be an application processor (AP), a graphics-only processing unit (such as a graphics processing unit (GPU), a visual processing unit (VPU)), and/or an Artificial Intelligence (AI)-dedicated processor (such as a neural processing unit (NPU)). As set forth above, the processor 408 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

In an embodiment herein, the plurality of modules of the processor 408 of the UE 402 can communicate with the via the communication module 410. The communication module 410 may be in the form of either a wired network or a wireless communication network module including various communication circuitry. The wireless communication network may comprise, but not limited to, Global Positioning System (GPS), Global System for Mobile Communications (GSM), Wi-Fi, Bluetooth low energy, Near-field communication (NFC), and so on. The wireless communication may further comprise one or more of Bluetooth, ZigBee, a short-range wireless communication (such as Ultra-Wideband (UWB)), and a medium-range wireless communication (such as Wi-Fi) or a long-range wireless communication (such as 3G/4G/5G/6G and non-3GPP technologies or WiMAX), according to the usage environment.

In an embodiment herein, the memory module 412 may comprise one or more volatile and non-volatile memory components (e.g., memory(ies)) which are capable of storing data and instructions of the modules of the UE 402 to be executed. Examples of the memory module 412 can be, but not limited to, NAND, embedded Multi Media Card (eMMC), Secure Digital (SD) cards, Universal Serial Bus (USB), Serial Advanced Technology Attachment (SATA), solid-state drive (SSD), and so on. The memory module 412 may also include one or more computer-readable storage media. Examples of non-volatile storage elements may include magnetic hard discs, optical discs, floppy discs, flash memories, or forms of electrically programmable memories (EPROM) or electrically erasable and programmable (EE-PROM) memories. In addition, the memory module 412 may, in some examples, be considered a non-transitory storage medium. The term "non-transitory" may indicate that the storage medium is not embodied in a carrier wave or a propagated signal. However, the term "non-transitory" should not be interpreted to mean that the memory module 412 is non-movable. In certain examples, a non-transitory storage medium may store data that can, over time, change (for example, in Random Access Memory (RAM) or cache).

FIG. 4 illustrates various example modules of the UE 402, but it is to be understood that other embodiments are not limited thereto. In various embodiments, the UE 402 may include less or more number of modules. Further, the labels or names of the modules are used only for illustrative purpose and does not limit the scope of the disclosure. One or more modules can be combined together to perform same or substantially similar function in the UE 402.

FIG. 5 is a flowchart illustrating an example method 500 for UL Sync during NTN connectivity according to various embodiments. The method 500 comprises setting, by the UE 402, a timer value of a current UL Sync validity duration in a pre-defined (e.g., specified) ratio of NTN UL Sync validity duration (T430), as illustrated in step 502, once SI of a serving cell 404 is acquired and an NTN UL Sync validity duration (T430) is started. The method 500 comprises verifying, by the UE 402, an RRC state and an emergency call status of the UE 402, as illustrated in step 504, on expiry of the set timer value of the current UL Sync validity duration.

The method 500 comprises determining, by the UE 402, a subsequent periodicity value of the SI for re-acquiring the SI, based on the RRC state and the emergency call status of the UE 402, as illustrated in step 506. The method 500 comprises updating, by the UE 402, the timer value as the NTN UL Sync validity duration (T430), as illustrated in step 508, when the SI has been re-acquired. The timer value is updated before the expiry of a time-lapse of the NTN UL Sync validity duration (T430). Thereafter, the method 500 comprises restarting, by the UE 402, the timer value of the updated NTN UL Sync validity duration (T430) for the serving cell 404, as illustrated in step 510.

The various operations illustrated in method 500 may be performed in the order presented, in a different order or simultaneously. Further, in various embodiments, some actions listed in FIG. 5 may be omitted.

Figure 6:
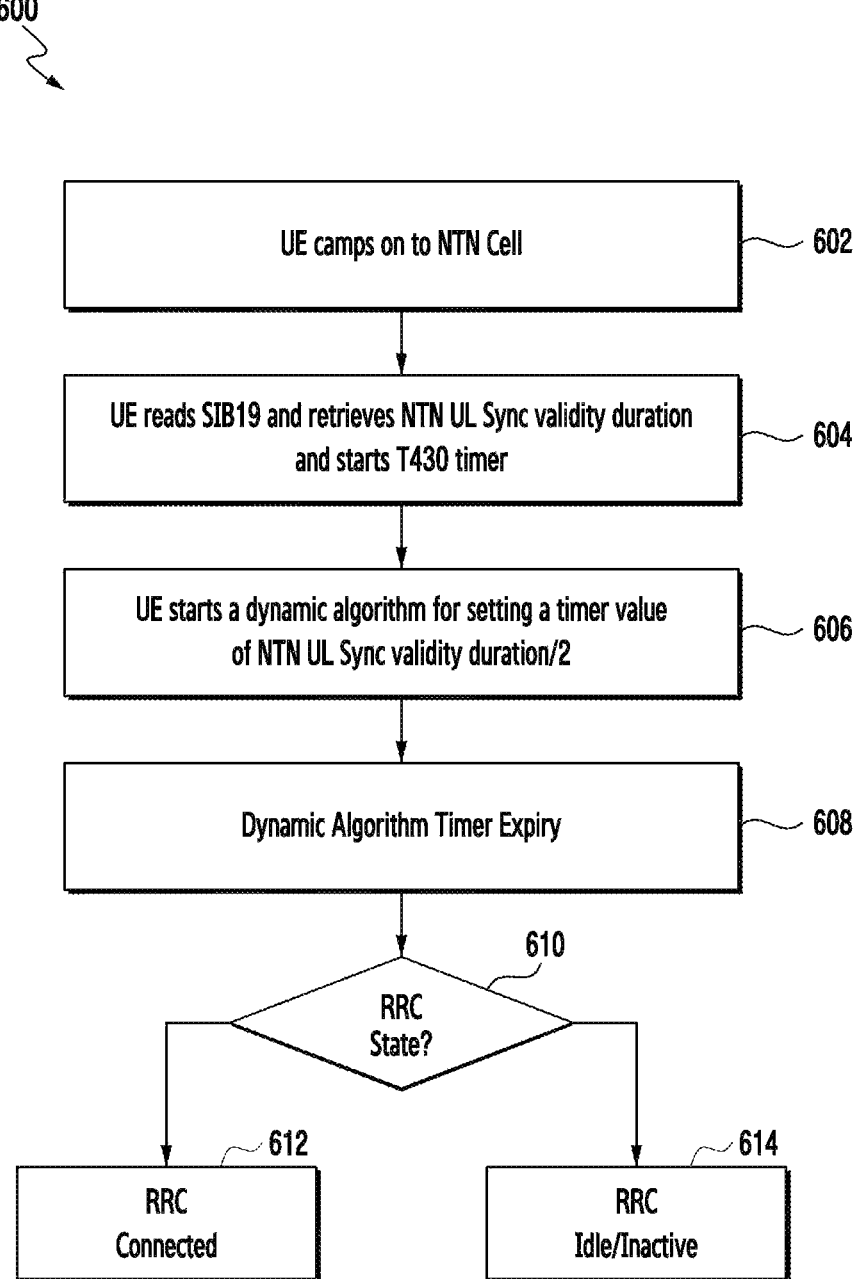
FIG. 6 is a flowchart illustrating an example method for re-acquiring SIB for UL Sync during NTN connectivity, according to various embodiments.

FIG. 6 is a flowchart illustrating an example method 600 for re-acquiring SIB for UL Sync during NTN connectivity according to various embodiments. The UE 402 camps onto a NTN Cell (serving cell 404), as illustrated in step 602. The UE 402 reads SIB19, retrieves NTN UL Sync validity duration (T430) and starts T430 timer, as illustrated in step 604. The UE 402 starts a dynamic algorithm for setting the timer value of the current UL Sync validity duration as half of the NTN UL Sync validity duration (T430) (NTN UL Sync validity duration (T430)/2), as illustrated in step 606. The UE 402 starts the timer value of T430/2 in parallel to the T430. On expiry of the timer value of T430/2, as illustrated in step 608, the UE 402 starts the dynamic algorithm to determine next periodicity to read SIB-19. The UE 402 verifies an RRC state, as illustrated in step 610. The UE 402 can determine whether the RRC state is either in RRC connected state as illustrated in step 612 or an RRC idle/inactive state as illustrated in step 614.

The various operations illustrated in the flowchart 600 may be performed in the order presented, in a different order or simultaneously. Further, in various embodiments, some actions listed in FIG. 6 may be omitted.

FIG. 7 is a flowchart illustrating an example method 700 for re-acquiring SIB for UL Sync during NTN connectivity if the RRC state is the RRC connected state according to various embodiments. If the RRC state is the RRC connected state, as illustrated in step 702, the current status of the UE 402 is verified. If the current status of the UE 402 is data activity or a voice call and emergency call is not ongoing as illustrated in step 704, the UE 402 verifies a periodicity value of the SIB19 as illustrated in step 706. The UE 402 calculates a number of periodicity values of the SIB19 remaining in the current UL Sync validity duration (T430) time period by excluding DRX cycle (Discontinuous Reception cycle), as illustrated in step 708, based on the periodicity value of the SIB19 as broadcasted by the network 406 in SIB1. The UE 402 calculates a number of periodicity values of the SIB19 remaining in the current UL Sync validity duration (T430) time period by excluding DRX cycle, as illustrated in step 710, based on a maximum value of the periodicity value of the SIB19 (for example 512 ms), if the periodicity value of the SIB19 indicates as an on-demand SIB.

The UE 402 evaluates one or more iterations remaining to read the SIB19, as illustrated in step 712, based on the calculated number of periodicity values of the SIB19 remaining in the current UL Sync validity duration (T430) time period. The UE 402 updates an SIB19 reading cycle as appropriate iteration, as illustrated in step 714, which is higher than iteration determined for a RRC idle state scenario from the evaluated iterations. For example, the UE 402 updates the SIB acquisition time T as (n−5)th iteration. The UE 402 repeats status check on each SI (N+1 SI cycle), as illustrated in step 716, based on the updated SIB19 reading cycle to re-acquire the SIB19. The UE 402 performs SIB acquisition, as illustrated in step 718, on a timer T value. If the SIB acquisition is successful, the UE 402 updates UL Sync based on epoch time and restarts T430 based on values in latest SIB19 (the subsequent periodicity value of the SIB19), as illustrated in step 720. If the SIB acquisition fails, then the UE 402 repeats to perform SIB19 acquisition on repetition cycle set until SIB19 gets acquired, as illustrated in step 722.

The various operations illustrated in the flowchart 700 may be performed in the order presented, in a different order or simultaneously. Further, in various embodiments, some actions listed in FIG. 7 may be omitted.

Figure 8:
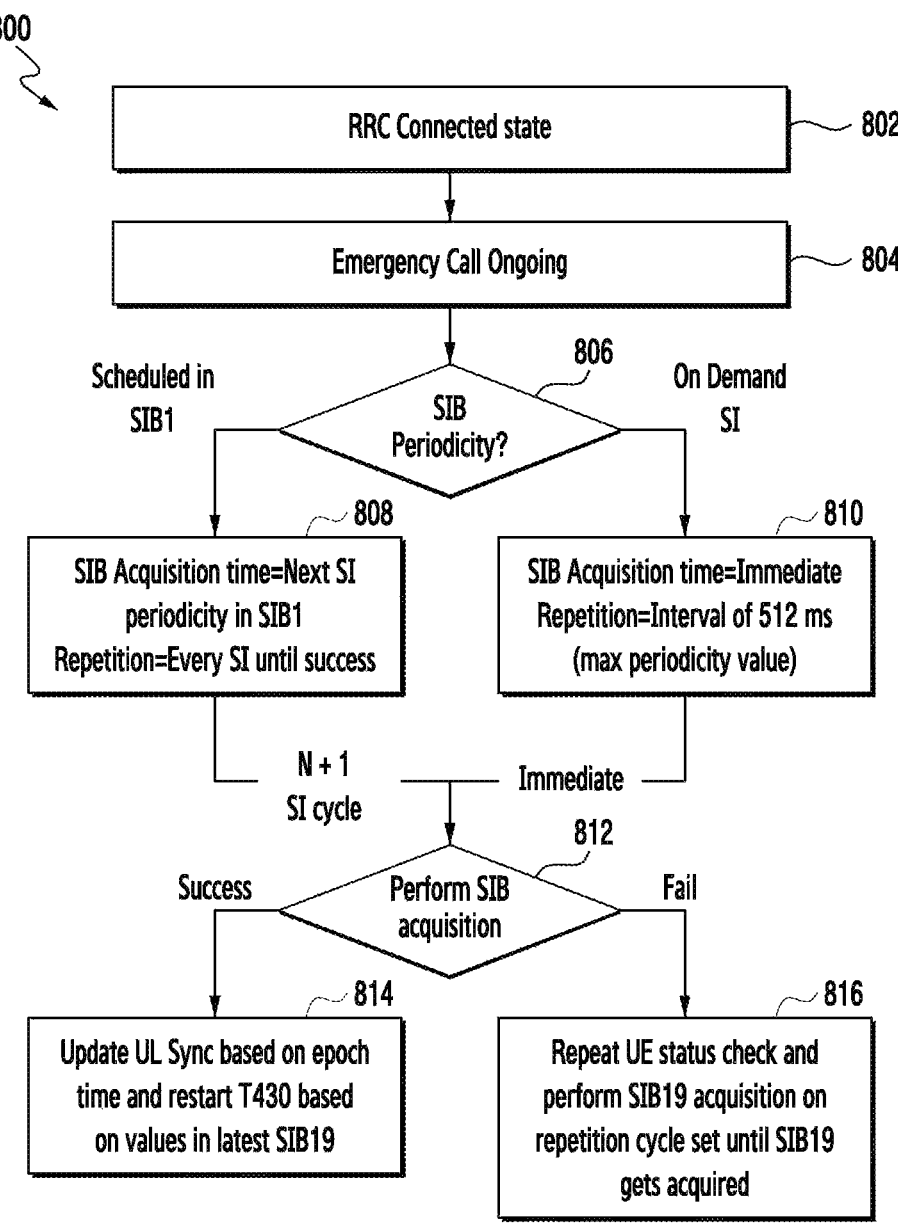
FIG. 8 is a flowchart illustrating an example method for re-acquiring SIB for UL Sync during NTN connectivity if the RRC state is the RRC connected state, according to various embodiments.

FIG. 8 is a flowchart illustrating an example method 800 for re-acquiring SIB for UL Sync during NTN connectivity if the RRC state is the RRC connected state according to various embodiments. If the RRC state is the RRC connected state, as illustrated in step 802, the current status of the UE 402 is verified. If the current status of the UE 402 is emergency call ongoing as illustrated in step 804, the UE 402 verifies a periodicity value of the SIB19 as illustrated in step 806. The UE 402 determines the subsequent periodicity value of the SIB19 as the SIB19 reading cycle for re-acquiring the SIB19, as illustrated in step 808, based on the periodicity value of the SIB19 as broadcasted by the network 406 in SIB1. For example, the SIB acquisition time is next SI periodicity in SIB1. Repetition is performed for every SI until success. The UE 402 reads the SIB19 on each iteration of the determined subsequent periodicity value of the SIB19, until the SIB19 has acquired.

The UE 402 determines a current periodicity value of the SIB19 as the SIB19 reading cycle for re-acquiring the SIB19, as illustrated in step 810, based on a maximum value of the periodicity value of the SIB19, if the periodicity value of the SIB19 indicates as an on-demand SIB. For example, the SIB acquisition time is immediate repetition with interval of 512 ms (maximum periodicity value).

The UE 402 performs SIB acquisition, as illustrated in step 812, by reading the SIB19 immediately through the on-demand SIB and repeating reading (N+1 SI cycles), until the SIB19 has acquired. If the SIB acquisition is successful, then the UE 402 updates UL Sync based on epoch time and restarts T430 based on values in latest SIB19 (the subsequent periodicity value of the SIB19), as illustrated in step 814. If the SIB acquisition fails, then the UE 402 repeats UE status check and performs SIB19 acquisition on repetition cycle set until SIB19 gets acquired, as illustrated in step 816.

The various operations illustrated in the flowchart 800 may be performed in the order presented, in a different order or simultaneously. Further, in various embodiments, some actions listed in FIG. 8 may be omitted.

Figure 9:
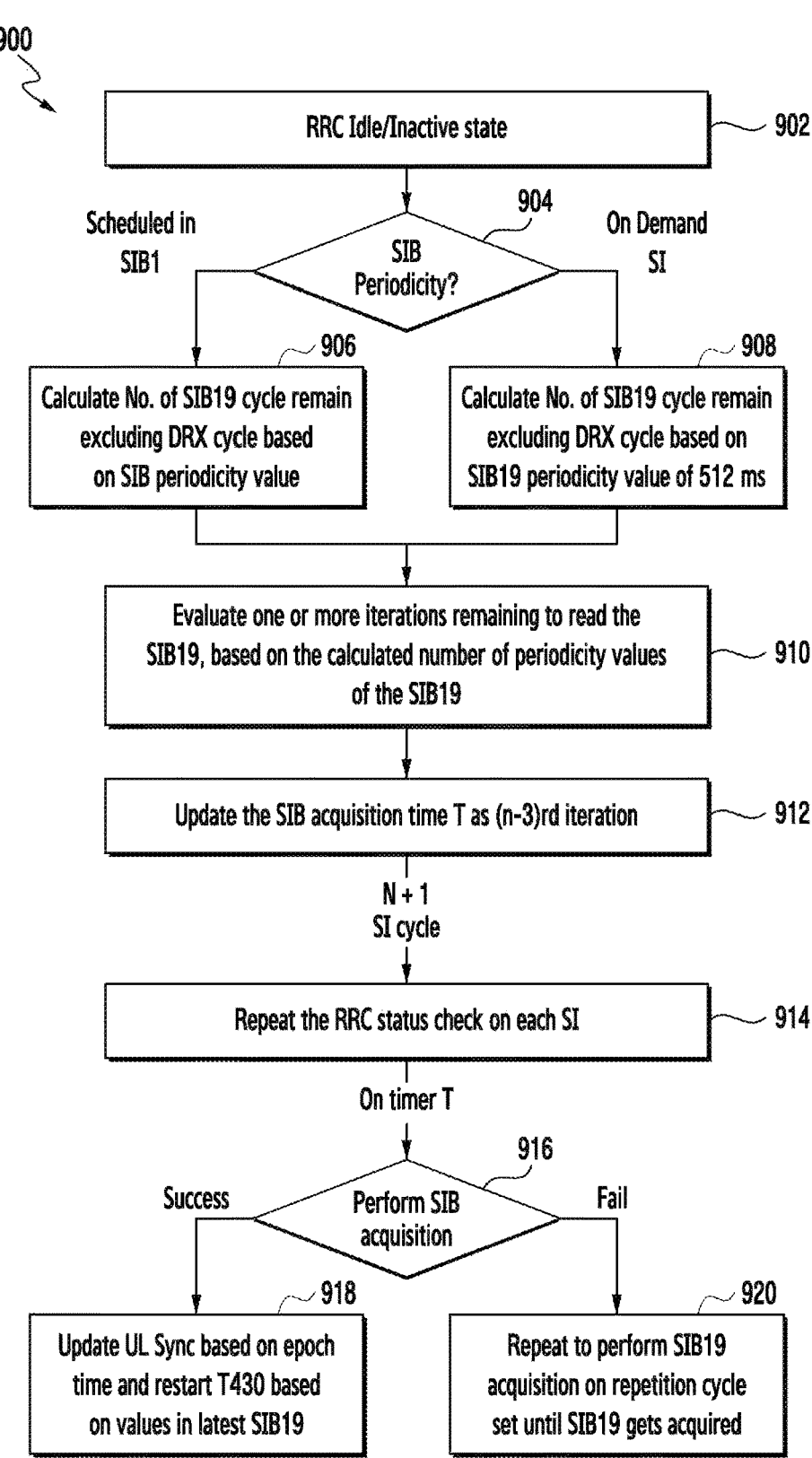
FIG. 9 is a flowchart illustrating an example method for re-acquiring SIB for UL Sync during NTN connectivity if the RRC state is the RRC idle/inactive state, according to various embodiments.

FIG. 9 is a flowchart illustrating an example method 900 for re-acquiring SIB for UL Sync during NTN connectivity if the RRC state is the RRC idle/inactive state according to various embodiments. When the RRC state is the RRC idle/inactive state, as illustrated in step 902, the UE 402 verifies a periodicity value of the SIB19 as illustrated in step 904. The UE 402 calculates a number of periodicity values of the SIB19 remaining in the current UL Sync validity duration (T430) time period by excluding DRX cycle (Discontinuous Reception cycle), as illustrated in step 906, based on the periodicity value of the SIB19 as broadcasted by the network 406 in SIB1. The UE 402 calculates a number of periodicity values of the SIB19 remaining in the current UL Sync validity duration (T430) time period by excluding DRX cycle, as illustrated in step 908, based on a maximum value of the periodicity value of the SIB19 (for example 512 ms, if the periodicity value of the SIB19 indicates as an on-demand SIB.

The UE 402 evaluates one or more iterations remaining to read the SIB19, as illustrated in step 910, based on the calculated number of periodicity values of the SIB19 remaining in the current UL Sync validity duration (T430) time period. The UE 402 updates an SIB19 reading cycle as appropriate iteration, as illustrated in step 912, which is lesser than iteration determined for the RRC connected state scenario from the evaluated iterations. For example, the UE 402 updates the SIB acquisition time T as $(n-3)^{rd}$ iteration. The UE 402 repeats the RRC status check on each SI (N+1 SI cycle), as illustrated in step 914, based on the updated SIB19 reading cycle to re-acquire the SIB19. The UE 402 performs SIB acquisition, as illustrated in step 916, on a timer T value. If the SIB acquisition is successful, then the UE 402 updates UL Sync based on epoch time and restarts T430 based on values in latest SIB19 (the subsequent periodicity value of the SIB19), as illustrated in step 918. If the SIB acquisition fails, then the UE 402 repeats to perform SIB19 acquisition on repetition cycle set until SIB19 gets acquired, as illustrated in step 920.

The various operations illustrated in the flowchart 900 may be performed in the order presented, in a different order or simultaneously. Further, in various embodiments, some actions listed in FIG. 9 may be omitted.

Figure 10:
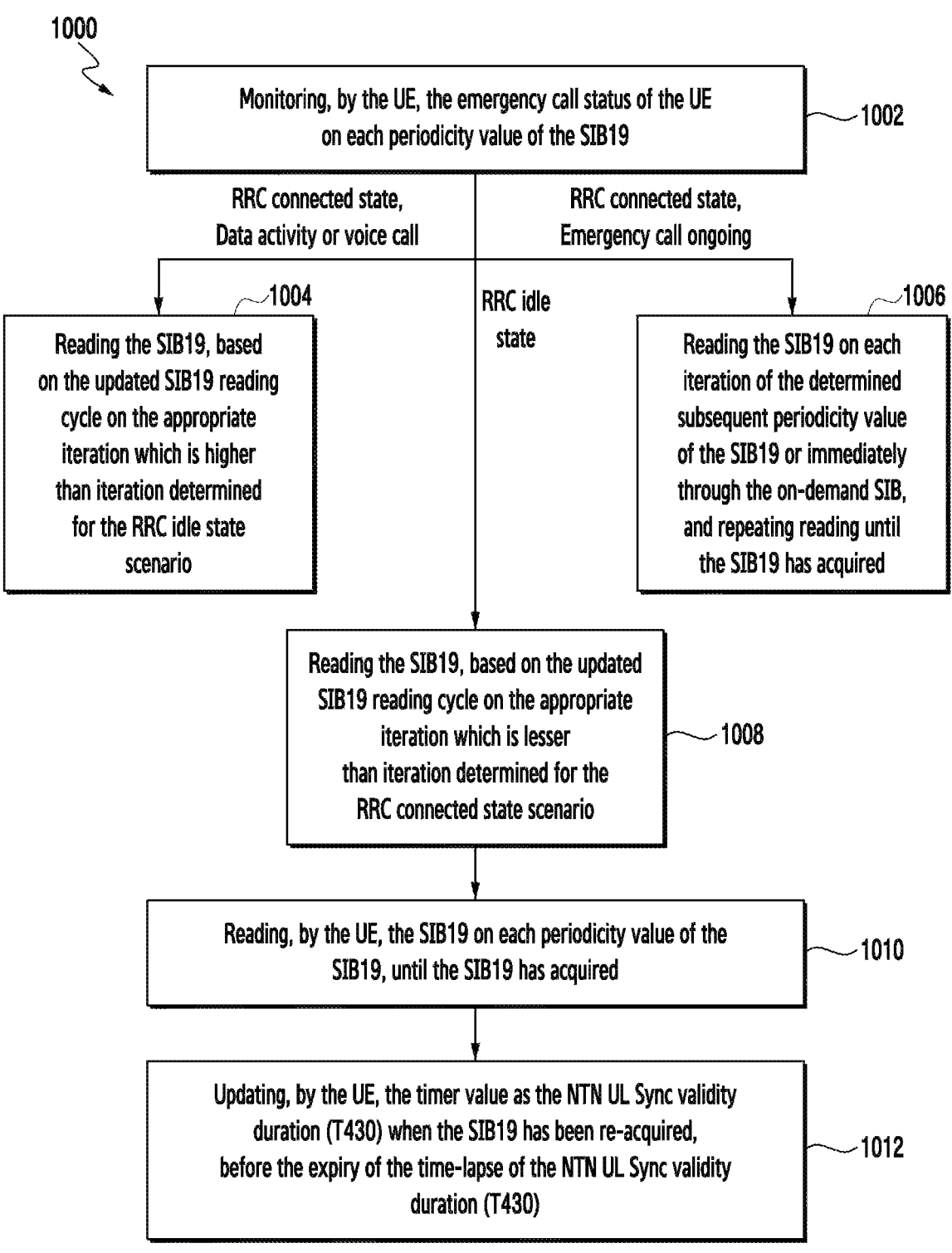
FIG. 10 is a flowchart illustrating an example method for updating the timer value as the NTN UL Sync validity duration (T430) when the SIB19 has been re-acquired, according to various embodiments.

FIG. 10 is a flowchart illustrating an example method 1000 for updating the timer value as the NTN UL Sync validity duration (T430) when the SIB19 has been re-acquired according to various embodiments. The method 1000 comprises monitoring, by the UE 402, the emergency call status of the UE 402 on each periodicity value of the SIB19, as illustrated in step 1002. The method 1000 comprises reading, by the UE 402, the SIB19, based on the updated SIB19 reading cycle on the appropriate iteration which is higher than iteration determined for the RRC idle state scenario, if the RRC state is a RRC connected state and the current status of the UE 402 is data activity or voice call and emergency call is not ongoing, for re-acquiring the SIB19 in a current serving cell 404, as illustrated in step 1004.

The method 1000 comprises reading, by the UE 402, the SIB19 on each iteration of the determined subsequent periodicity value of the SIB19 or immediately through the on-demand SIB, and repeating reading until the SIB19 has acquired, if the RRC state is the RRC connected state and the emergency call is ongoing, for re-acquiring the SIB19 in the current serving cell 404, as illustrated in step 1006. The method 1000 comprises reading, by the UE 402, the SIB19, based on the updated SIB19 reading cycle on the appropriate iteration which is lesser than iteration determined for the RRC connected state scenario, if the RRC state is the RRC idle state, for re-acquiring the SIB19 in the current serving cell 404, as illustrated in step 1008.

The method 1000 comprises reading, by the UE 402, the SIB19 on each periodicity value of the SIB19, until the SIB19 has acquired, as illustrated in step 1010. Thereafter, the method 1000 comprises updating, by the UE 402, the timer value as the NTN UL Sync validity duration (T430) when the SIB19 has been re-acquired, before the expiry of the time-lapse of the NTN UL Sync validity duration (T430), as illustrated in step 1012.

The various operations illustrated in the flowchart 1000 may be performed in the order presented, in a different order or simultaneously. Further, in various embodiments, some actions listed in FIG. 10 may be omitted.

Figure 11:
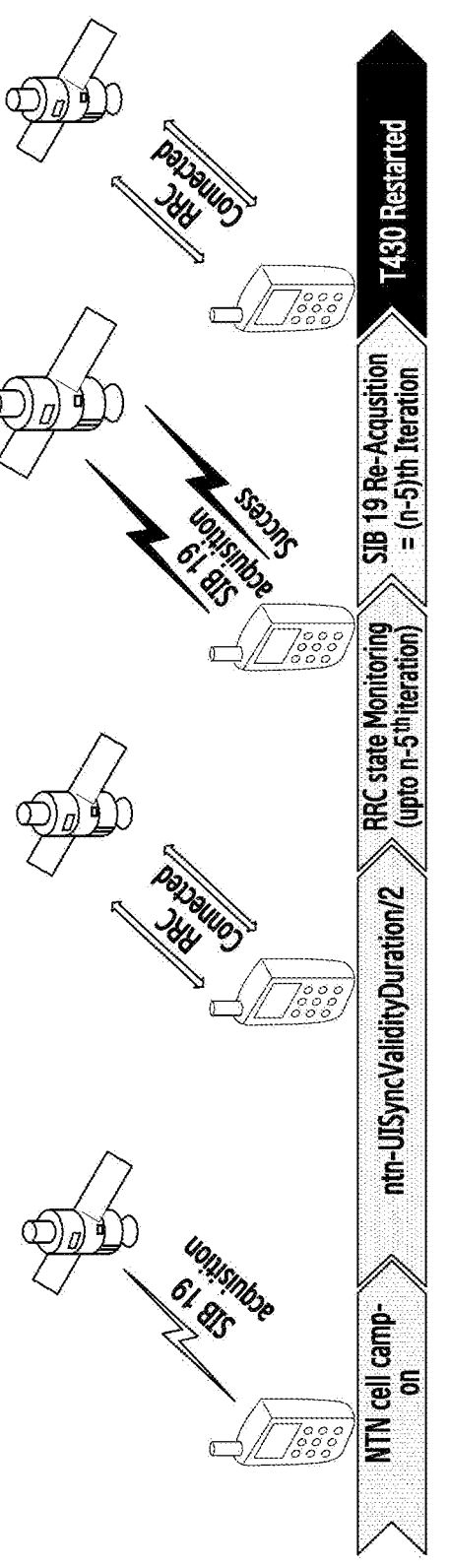
FIG. 11 is a diagram illustrating an example scenario using the dynamic algorithm during the RRC Connected state and emergency call inactive, according to various embodiments.

FIG. 11 is a diagram illustrating an example scenario using the dynamic algorithm during the RRC connected state and emergency call inactive according to various embodiments. Consider the scenario that the UE 402 is in a RRC connected state and data connection is ongoing with SIB periodicity of 512 ms. The UE 402 acquires the SIB19 during cell camp on and T430 timer gets started. As per an example embodiment of the disclosure, the dynamic algorithm starts the SIB19 read timer value as half of the NTN UL Sync validity duration timer value (half of T430 timer value). On SIB19 read timer expiry, the example algorithm checks for UE emergency call status and as the emergency call status is inactive, the number of SI iteration remaining is calculated excluding the DRX cycle inactive timer period. Further, the UE 402 checks for RRC state and as the RRC is in connected state, the time period to read SIB19 is decided as $(N–5)^{th}$ iteration. The dynamic algorithm evaluates the UE status periodically and updates the time instance to read SIB19. The dynamic algorithm gives more chances and enough time to re-acquire SIB-19 before T430 expiry on RRC connected state. This dynamic algorithm ensures the service connectivity without UL synchronization loss and data failure which enriches the user experience.

Figure 12:
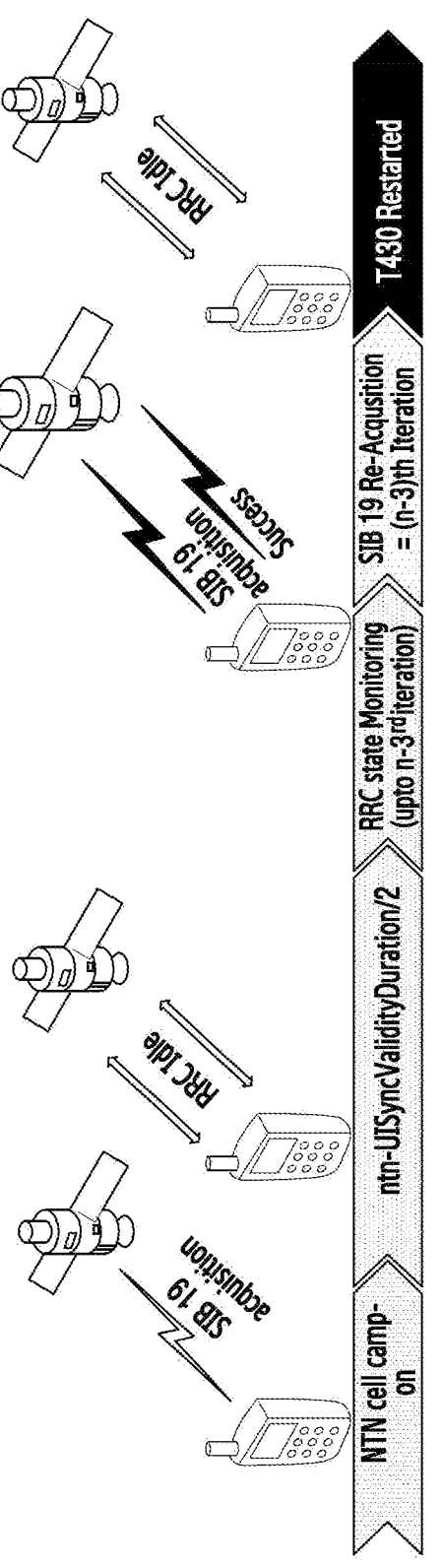
FIG. 12 is a diagram illustrating an example scenario using the dynamic algorithm during the RRC idle state, according to various embodiments.

FIG. 12 is a diagram illustrating an example scenario using the dynamic algorithm during the RRC idle state according to various embodiments. Consider the scenario of UE 402 in RRC Idle state and SIB periodicity is 8 ms. The UE 402 acquires SIB19 during cell camp on and T430 timer gets started, and emergency call is inactive in UE 402. The dynamic algorithm starts the SIB19 read timer value as half of NTN UL Sync validity duration timer value (half of T430 timer value). On SIB19 read timer expiry, according to an example embodiment of the disclosure, the algorithm checks for UE emergency call status and as the UE emergency call status inactive, the algorithm calculates the number of SI iteration remaining excluding DRX cycle inactive timer period. The UE 402 checks for RRC state and as the RRC state is idle, the UE 402 decides the time period to read SIB19 as $(N–3)^{rd}$ iteration. The dynamic algorithm gives time to re-acquire SIB-19 before T430 expiry but at the same time to use T430 timer fully without wasting network resource. This dynamic algorithm ensures the usage of time gap for SIB19 read and utilizes network resources properly. The example dynamic algorithm calculates the time instance by considering SI periodicity and NTN UL Sync validity duration value and so solution become feasible in all scenarios.

Figure 13:
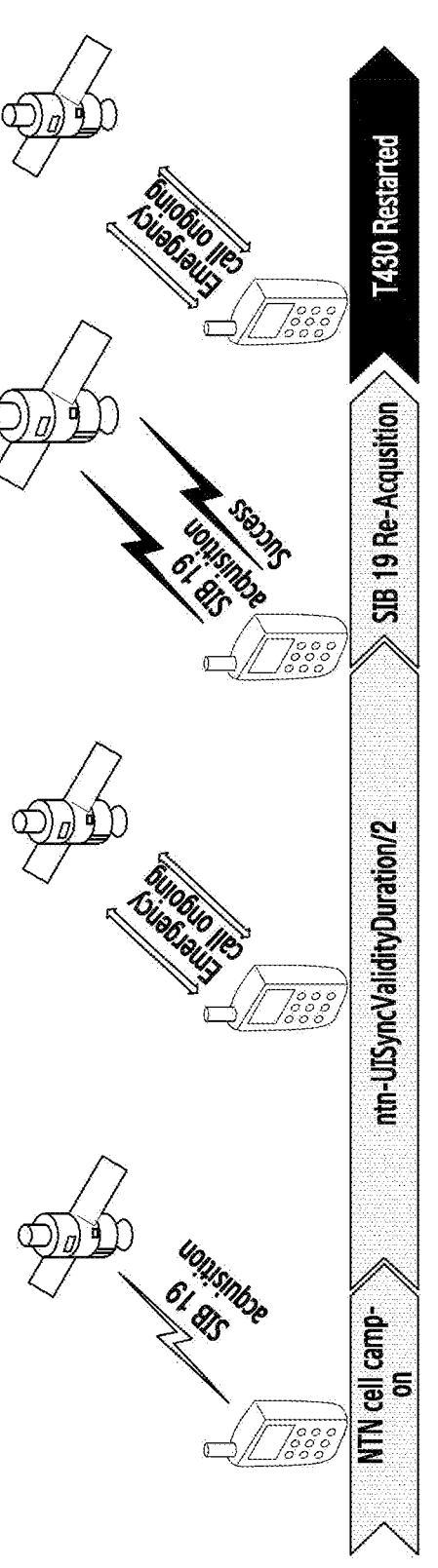
FIG. 13 is a diagram illustrating an example scenario using the dynamic algorithm during the emergency call active in NTN cell, according to various embodiments.

FIG. 13 is a diagram illustrating an example scenario using the dynamic algorithm during the emergency call active in NTN cell according to various embodiments. Consider the scenario of UE 402 in emergency call active and SIB periodicity is 512 ms. The UE 402 acquires SIB19 during cell camp on and T430 timer gets started. As per an example embodiment of the disclosure, the dynamic algorithm starts the SIB19 read timer value as half of NTN UL Sync validity duration timer value (half of T430 timer value). On SIB19 read timer expiry, the disclosed algorithm checks for UE emergency call status and as the emergency call status is active, the algorithm starts to acquire SIB-19 on every SI periodicity. NTN UL Sync validity duration timer minimum value is 5 seconds, and therefore even if NTN UL Sync validity is minimum and SIB periodicity has maximum value of 512 ms, the UE 402 gets minimum of 4 SI iteration to read SIB-19. The dynamic algorithm gives more chances and enough time to reacquire SIB-19 before T430 expiry on emergency call active. This leads to emergency call continuity which enhances user experience and service continuity.

Therefore, the example system 400 determines the instances and periodicity to re-acquire SIB19 before expiry of T430 in current serving cell 404. The system 400 monitors the UE status periodically and dynamically executes the algorithm to re-acquire SIB-19 such that the UE 402 does not loose NTN service in current serving cell 404. The system 400 generates the dynamic algorithm to re-acquire SIB19 by considering different factors of UE's current status such as emergency call status, RRC states (idle/inactive/connected), SI periodicity of SIB19 and UL Sync validity timer duration, and accordingly performs acquisition of SIB19.

Therefore, the UE 402 should not lose service during emergency call ongoing which ensures the service continuity and values the importance of emergency service in NTN networks. The disclosed system 400 provides different approach between RRC connected state and RRC idle state to ensure zero data loss in connected state which improves the service continuity in NTN networks. Further, the SIB19 re-acquisition of serving cell 404 will be dynamic ensuring service continuity with zero tolerance in power consumption.

The various example embodiments disclosed herein can be implemented through at least one software program running on at least one hardware device and performing network management functions to control the network elements. The modules shown in FIG. 4 include blocks which can be at least one of a hardware device, or a combination of hardware device and software module.

The various example embodiments disclosed herein describes systems 400 and methods (500, 600, 700, 800, 900, 1000) for performing SIB acquisition based on UE's current active status and adjusting the timer value before T430 expiry. This ensures SIB19 acquisition in all possible situations in optimistic way and maintains service continuity with NTN cell. Therefore, it is understood that the scope of the disclosure is extended to such a program and in addition to a computer readable means having a message therein, such computer readable storage means contain program code means for implementation of one or more steps of the method, when the program runs on a server or mobile device or any suitable programmable device. The method may be implemented through or together with a software program written in e.g., Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g., hardware means like e.g., an ASIC, or a combination of hardware and software means, e.g., an ASIC and an FPGA, or at least one microprocessor and at least one memory with software modules located therein. The various example methods disclosed herein may be implemented partly in hardware and partly in software. The disclosure may be implemented on different hardware devices, e.g., using a plurality of CPUs.

According to embodiments, a method performed by a user equipment (UE) for an uplink synchronization (UL Sync) during non-terrestrial networks (NTN) connectivity is provided. The method comprises, based on acquiring system information (SI) of a serving cell that indicates an NTN UL Sync validity duration, setting, by the UE, a value of a UL Sync timer to the NTN UL Sync validity duration and a value of an acquisition timer to a specified ratio of the NTN UL Sync validity duration. The method comprises verifying, by the UE, a radio resource control (RRC) state and a call status of the UE based on expiry of the acquisition timer while the UL Sync timer is running. The method comprises determining, by the UE, a subsequent periodicity for re-acquiring the SI, based on the RRC state and the call status of the UE. The method comprises, based on re-acquiring the SI of the serving cell, that indicates a new NTN UL Sync validity duration, in accordance with the subsequent periodicity, updating, by the UE, the value of the UL Sync timer as the new NTN UL Sync validity duration for the serving cell before an expiry of a time-lapse of the NTN UL Sync validity duration. The method comprises restarting, by the UE, the UL Sync timer with the updated value of the UL Sync timer.

For example, the value of the acquisition timer is set as half of the NTN UL Sync validity duration.

For example, the SI of the serving cell comprises a System Information Block 19 (SIB19).

For example, the determining of the subsequent periodicity comprises verifying, by the UE, a periodicity value of the SIB19, based on the RRC state being an RRC connected state and the call status of the UE being data activity or voice call ongoing, in case that the SIB19 is broadcasted periodically, calculating, by the UE, a number of cycles of the SIB19 remaining until the expiry of the time-lapse of the NTN UL Sync validity duration, based on the periodicity value of the SIB19 as broadcasted by the network in System Information Block 1 (SIB1), in case that the SIB19 is provided through an on-demand SIB, calculating, by the UE, a number of cycles of the SIB19 remaining until the expiry of the time-lapse of the NTN UL Sync validity duration, based on a maximum value of a periodicity value of the SIB19, determining, by the UE, the subsequent periodicity for re-acquiring the SI based on the calculated number of cycles of the SIB19. The subsequent periodicity for re-acquiring the SI is shorter than a periodicity re-acquiring the SI determined for RRC idle state scenario.

For example, the determining of the subsequent periodicity comprises verifying, by the UE, a periodicity value of the SIB19, based on the RRC state being the RRC connected state and the call status of the UE being emergency call ongoing, in case that the SIB19 is broadcasted periodically, determining, by the UE, the subsequent periodicity of the SIB19 as the periodicity value of the SIB19 as broadcasted by the network in SIB1 and attempt to re-acquire the SIB19 in next cycle of SIB19, in case that the SIB19 is provided through an on-demand SIB, determining, by the UE, the subsequent periodicity of the SIB19 as a maximum value of a periodicity value of the SIB19 attempt to re-acquire the SIB19 immediately.

For example, the determining of the subsequent periodicity comprises, verifying, by the UE, a periodicity value of the SIB19, based on the RRC state being the RRC idle state, in case that the SIB19 is broadcasted periodically, calculating, by the UE, a number of cycles of the SIB19 remaining until the expiry of the time-lapse of the NTN UL Sync validity duration, based on the periodicity value of the SIB19 as broadcasted by the network in in System Information Block 1 (SIB1), in case that the SIB19 is provided through an on-demand SIB, calculating, by the UE, a number of cycles of the SIB19 remaining until the expiry of the time-lapse of the NTN UL Sync validity duration, based on a maximum value of a periodicity value of the SIB19, determining, by the UE, the subsequent periodicity for re-acquiring the SI based on the calculated number of cycles of the SIB19. The subsequent periodicity for re-acquiring the SI is longer than a periodicity re-acquiring the SI determined for RRC connected state scenario.

For example, the method of updating the UL Sync timer as the new NTN UL Sync validity duration comprises, monitoring, by the UE, the call status of the UE on each period of the SI, in case that the RRC state is an RRC connected state and the call status of the UE does not indicate emergency call ongoing, reading, by the UE, the SIB19, based on a SIB19 reading cycle, in case that the RRC state is an RRC connected state and the call status of the UE indicates emergency call ongoing, reading, by the UE, the SIB19 on a periodicity value of the SIB19 broadcasted by network or immediately through the on-demand SIB, and repeating reading until the SIB19 has acquired, in case that the RRC state is an RRC idle state, reading, by the UE, the SIB19, based on another SIB19 reading cycle which is less frequent than SIB19 reading cycle for the RRC connected state scenario, updating, by the UE, the UL Sync timer value as the new NTN UL Sync validity duration based on the read SIB19, before the expiry of the time-lapse of the NTN UL Sync validity duration.

For example, the subsequent periodicity value is determined based on a plurality of parameters included in the SI of the serving cell. The plurality of parameters include at least one of a current UL Sync validity duration, the an NTN UL Sync validity duration, ephemeris data, common timing advance (TA) parameters, k_offset, the UL sync validity duration, and epoch time.

For example, the RRC state of the UE corresponds to one of a RRC connected state, a RRC inactive state, and a RRC idle state. The cell status of the UE indicates whether emergency call is ongoing or not.

For example, the UL sync timer is T430 timer which starts from subframe indicated by the epoch time included in the SI of the serving cell.

According to embodiments, a user equipment (UE) for an uplink synchronization (UL Sync) during non-terrestrial networks (NTN) connectivity is provided. The UE comprises at least one processor, comprising processing circuitry. The UE comprises memory, comprising one or more storage mediums, storing instructions that, when executed by the at least one processor individually and/or collectively, cause the UE to, based on acquiring system information (SI) of a serving cell that indicates an NTN UL Sync validity duration, set a value of a UL Sync timer to the NTN UL Sync validity duration and a value of an acquisition timer to a specified ratio of the NTN UL Sync validity duration, verify a radio resource control (RRC) state and a call status of the UE based on expiry of the acquisition timer while the UL Sync timer is running, determine a subsequent periodicity for re-acquiring the SI, based on the RRC state and the call status of the UE, based on re-acquiring the SI of the serving cell, that indicates a new NTN UL Sync validity duration, in accordance with the subsequent periodicity, update the value of the UL Sync timer as the new NTN UL Sync validity duration for the serving cell before an expiry of a time-lapse of the NTN UL Sync validity duration, and restart the UL Sync timer with the updated value of the UL Sync timer.

For example, the value of the acquisition timer is set as half of the NTN UL Sync validity duration.

For example, the SI of the serving cell comprises a System Information Block 19 (SIB19).

For example, the instructions, when executed by the at least one processor, cause the UE to verify a periodicity value of the SIB19, based on the RRC state being an RRC connected state and the call status of the UE being data activity or voice call ongoing, in case that the SIB 19 is broadcasted periodically, calculate a number of cycles of the SIB19 remaining until the expiry of the time-lapse of the NTN UL Sync validity duration, based on the periodicity value of the SIB19 as broadcasted by the network in System Information Block 1 (SIB1), in case that the SIB19 is provided through an on-demand SIB, calculate a number of cycles of the SIB19 remaining until the expiry of the time-lapse of the NTN UL Sync validity duration, based on a maximum value of a periodicity value of the SIB19, and determine the subsequent periodicity for re-acquiring the SI based on the calculated number of cycles of the SIB19, The subsequent periodicity for re-acquiring the SI is shorter than a periodicity re-acquiring the SI determined for RRC idle state scenario.

For example, the instructions, when executed by the at least one processor, cause the UE to verify a periodicity value of the SIB19, based on the RRC state being the RRC connected state and the call status of the UE being emergency call ongoing, in case that the SIB 19 is broadcasted periodically, determine the subsequent periodicity of the SIB19 as the periodicity value of the SIB19 as broadcasted by the network in SIB1 and attempt to re-acquire the SIB 19 in next cycle of SIB 19, in case that the SIB 19 is provided through an on-demand SIB, determine the subsequent periodicity of the SIB19 as a maximum value of a periodicity value of the SIB19 attempt to re-acquire the SIB 19 immediately.

For example, the instructions, when executed by the at least one processor, cause the UE to verify a periodicity value of the SIB19, based on the RRC state being the RRC idle state, in case that the SIB 19 is broadcasted periodically, calculate a number of cycles of the SIB19 remaining until the expiry of the time-lapse of the NTN UL Sync validity duration, based on the periodicity value of the SIB19 as broadcasted by the network in in System Information Block 1 (SIB1), in case that the SIB 19 is provided through an on-demand SIB, calculate a number of cycles of the SIB19 remaining until the expiry of the time-lapse of the NTN UL Sync validity duration, based on a maximum value of a periodicity value of the SIB19, and determine the subsequent periodicity for re-acquiring the SI based on the calculated number of cycles of the SIB19. The subsequent periodicity for re-acquiring the SI is longer than a periodicity re-acquiring the SI determined for RRC connected state scenario.

For example, the instructions, when executed by the at least one processor, cause the UE to monitor the call status of the UE on each period of the SI, in case that the RRC state is an RRC connected state and the call status of the UE does not indicate emergency call ongoing, reading the SIB19, based on a SIB19 reading cycle, in case that the RRC state is an RRC connected state and the call status of the UE indicates emergency call ongoing, read the SIB19 on a periodicity value of the SIB19 broadcasted by network or immediately through the on-demand SIB, and repeating reading until the SIB19 has acquired, in case that the RRC state is an RRC idle state, read the SIB19, based on another SIB19 reading cycle which is less frequent than SIB19 reading cycle for the RRC connected state scenario, and update the UL Sync timer value as the new NTN UL Sync validity duration based on the read SIB19, before the expiry of the time-lapse of the NTN UL Sync validity duration.

For example, the subsequent periodicity value is determined based on a plurality of parameters included in the SI of the serving cell. The plurality of parameters include at least one of a current UL Sync validity duration, the an NTN UL Sync validity duration, ephemeris data, common timing advance (TA) parameters, k_offset, the UL sync validity duration, and epoch time.

For example, the RRC state of the UE corresponds to one of a RRC connected state, a RRC inactive state, and a RRC idle state. The cell status of the UE indicates whether emergency call is ongoing or not.

For example, the UL sync timer is T430 timer which starts from subframe indicated by the epoch time included in the SI of the serving cell.

According to a non-transitory computer readable storage medium is provided. non-transitory computer readable storage medium configured to store instructions that, when executed by at least one processor individually and/or collectively, cause a user equipment (UE) for an uplink synchronization (UL Sync) during non-terrestrial networks (NTN) connectivity to, based on acquiring system information (SI) of a serving cell that indicates an NTN UL Sync validity duration, set a value of a UL Sync timer to the NTN UL Sync validity duration and a value of an acquisition timer to a specified ratio of the NTN UL Sync validity duration, verify a radio resource control (RRC) state and a call status of the UE based on expiry of the acquisition timer while the UL Sync timer is running, determine a subsequent periodicity for re-acquiring the SI, based on the RRC state and the call status of the UE, based on re-acquiring the SI of the serving cell, that indicates a new NTN UL Sync validity duration, in accordance with the subsequent periodicity, update the value of the UL Sync timer as the new NTN UL Sync validity duration for the serving cell before an expiry of a time-lapse of the NTN UL Sync validity duration, and restart the UL Sync timer with the updated value of the UL Sync timer.

According to embodiments, a method for Uplink Synchronization (UL Sync) during Non-Terrestrial networks (NTN) connectivity is provided. The method comprises setting, by a User Equipment (UE), a timer value of a current UL Sync validity duration in a specified ratio of an NTN UL Sync validity duration, based on a System Information (SI) of a serving cell being acquired and an NTN UL Sync validity duration being started; verifying, by the UE, a Radio Resource Control (RRC) state and an emergency call status of the UE based on expiry of the set timer value of the current UL Sync validity duration; determining, by the UE, a subsequent periodicity value of the SI for re-acquiring the SI, based on the RRC state and the emergency call status of the UE; updating, by the UE, the timer value as the NTN UL Sync validity duration based on the SI being re-acquired, before the expiry of a time-lapse of the NTN UL Sync validity duration; and restarting, by the UE, the timer value of the updated NTN UL Sync validity duration for the serving cell.

For example, the UE sets the timer value of the current UL Sync validity duration as half of the NTN UL Sync validity duration.

For example, the SI of the serving cell comprises a System Information Block 19 (SIB19).

For example, the method comprises verifying, by the UE, a periodicity value of the SIB19, based on the RRC state being an RRC connected state and a current status of the UE being data activity or a voice call and emergency call not ongoing; calculating, by the UE, a number of periodicity values of the SIB19 remaining in the current UL Sync validity duration time period, based on the periodicity value of the SIB19 as broadcasted by the network in SIB1; calculating, by the UE, a number of periodicity values of the SIB19 remaining in the current UL Sync validity duration time period, based on a maximum value of the periodicity value of the SIB19, based on the periodicity value of the SIB19 indicating an on-demand SIB; evaluating, by the UE, one or more iterations remaining to read the SIB19, based on the calculated number of periodicity values of the SIB19 remaining in the current UL Sync validity duration time period; updating, by the UE, an SIB19 reading cycle as appropriate iteration higher than an iteration determined for an RRC idle state scenario from the evaluated one or more iterations; and determining, by the UE, the subsequent periodicity value of the SIB19, based on the updated SIB19 reading cycle to re-acquire the SIB19.

For example, the method comprises verifying, by the UE, a periodicity value of the SIB19, based on the RRC state being the RRC connected state and the current status of the UE being emergency call ongoing; determining, by the UE, the subsequent periodicity value of the SIB19 as the SIB19 reading cycle for re-acquiring the SIB19, based on the periodicity value of the SIB19 as broadcasted by the network in SIB1; reading, by the UE, the SIB19 on each iteration of the determined subsequent periodicity value of the SIB19, until the SIB19 has been acquired; determining, by the UE, a current periodicity value of the SIB19 as the SIB19 reading cycle for re-acquiring the SIB19, based on a maximum value of the periodicity value of the SIB19, based on the periodicity value of the SIB19 indicating an on-demand SIB; and reading, by the UE, the SIB19 immediately through the on-demand SIB and repeating reading, until the SIB19 has acquired.

For example, the method comprises verifying, by the UE, a periodicity value of the SIB19, based on the RRC state being the RRC idle state; calculating, by the UE, a number of periodicity values of the SIB19 remaining in the current UL Sync validity duration time period, based on the periodicity value of the SIB19 as broadcasted by the network in SIB1; calculating, by the UE, a number of periodicity values of the SIB19 remaining in the current UL Sync validity duration time period, based on a maximum value of the periodicity value of the SIB19, based on the periodicity value of the SIB19 indicating an on-demand SIB; evaluating, by the UE, one or more iterations remaining to read the SIB19, based on the calculated number of periodicity values of the SIB19 remaining in the current UL Sync validity duration time period; updating, by the UE, an SIB19 reading cycle on appropriate iteration less than an iteration determined for the RRC connected state scenario from the evaluated one or more iterations; and determining, by the UE, the subsequent periodicity value of the SIB19, based on the updated SIB19 reading cycle to re-acquire the SIB19.

For example, the method of updating the timer value as the NTN UL Sync validity duration based on the SIB19 being re-acquired comprises monitoring, by the UE, the emergency call status of the UE on each periodicity value of the SIB19; reading, by the UE, the SIB19, based on the updated SIB19 reading cycle on the appropriate iteration higher than an iteration determined for the RRC idle state scenario, based on the RRC state being an RRC connected state and the current status of the UE being data activity or voice call and emergency call not ongoing, for re-acquiring the SIB19 in a current serving cell; reading, by the UE, the SIB19 on each iteration of the determined subsequent periodicity value of the SIB19 or immediately through the on-demand SIB, and repeating reading until the SIB19 has acquired, based on the RRC state being the RRC connected state and the emergency call ongoing, for re-acquiring the SIB19 in the current serving cell; reading, by the UE, the SIB19, based on the updated SIB19 reading cycle on the appropriate iteration less than an iteration determined for the RRC connected state scenario, based on the RRC state being the RRC idle state, for re-acquiring the SIB19 in the current serving cell; reading, by the UE, the SIB19 on each periodicity value of the SIB19, until the SIB19 has been acquired; and updating, by the UE, the timer value as the NTN UL Sync validity duration based on the SIB19 being re-acquired, before the expiry of the time-lapse of the NTN UL Sync validity duration.

According to embodiments, a User Equipment (UE) is provided The UE comprises a memory; and at least one processor, comprising processing circuitry, individually and/or collectively, configured to, set a timer value of a current uplink synchronization (UL Sync) validity duration in a specified ratio of a non-terrestrial network (NTN) UL Sync validity duration, based on a System Information (SI) of a serving cell being acquired and an NTN UL Sync validity duration being started; verify a Radio Resource Control (RRC) state and an emergency call status of the UE based on expiry of the set timer value of the current UL Sync validity duration; determine a subsequent periodicity value of the SI for re-acquiring the SI, based on the RRC state and the emergency call status of the UE; update the timer value as the NTN UL Sync validity duration when the SI has been re-acquired, before the expiry of a time-lapse of the NTN UL Sync validity duration; and restart the timer value of the updated NTN UL Sync validity duration for the serving cell.

According to embodiments, a method for Uplink Synchronization (UL Sync) during Non-Terrestrial networks (NTN) connectivity is provided. The method comprises determining, by a User Equipment (UE), a subsequent periodicity value of a System Information (SI) of a serving cell to re-acquire the SI, based on a plurality of parameters and a plurality of states; and updating, by the UE, a timer value as an NTN UL Sync validity duration based on the SI being re-acquired, before the expiry of a time-lapse of the NTN UL Sync validity duration, based on the determined subsequent periodicity value of the SI.

For example, the plurality of parameters comprise at least one of a current UL Sync validity duration, the an NTN UL Sync validity duration, ephemeris data, common Timing Advance (TA) parameters, k_offset, and validity duration for UL sync information and epoch, and the plurality of states comprises at least one of a Radio Resource Control (RRC) state, an emergency call status of the UE, and a periodicity value of the SI.

For example, the method comprises setting, by the UE, a timer value of the current UL Sync validity duration in a specified ratio of the NTN UL Sync validity duration; and verifying, by the UE, the RRC state and the emergency call status of the UE, based on expiry of the set timer value of the current UL Sync validity duration.

For example, the UE sets the timer value of the current UL Sync validity duration as half of the NTN UL Sync validity duration.

For example, the SI of the serving cell comprises a System Information Block 19 (SIB19).

For example, the method comprises verifying, by the UE, a periodicity value of the SIB19, based on the RRC state being an RRC connected state and a current status of the UE being data activity or a voice call and emergency call not ongoing; calculating, by the UE, a number of periodicity values of the SIB19 remaining in the current UL Sync validity duration time period, based on the periodicity value of the SIB19 as broadcasted by the network in SIB1; calculating, by the UE, a number of periodicity values of the SIB19 remaining in the current UL Sync validity duration time period, based on a maximum value of the periodicity value of the SIB19, based on the periodicity value of the SIB19 indicating an on-demand SIB; evaluating, by the UE, one or more iterations remaining to read the SIB19, based on the calculated number of periodicity values of the SIB19 remaining in the current UL Sync validity duration time period; updating, by the UE, an SIB19 reading cycle as appropriate iteration higher than an iteration determined for a RRC idle state scenario from the evaluated one or more iterations; and determining, by the UE, the subsequent periodicity value of the SIB19, based on the updated SIB19 reading cycle to re-acquire the SIB19.

For example, the method comprises verifying, by the UE, a periodicity value of the SIB19, based on the RRC state being the RRC connected state and the current status of the UE being emergency call ongoing; determining, by the UE, the subsequent periodicity value of the SIB19 as the SIB19 reading cycle for re-acquiring the SIB19, based on the periodicity value of the SIB19 as broadcasted by the network in SIB1; reading, by the UE, the SIB19 on each iteration of the determined subsequent periodicity value of the SIB19, until the SIB19 has acquired; determining, by the UE, a current periodicity value of the SIB19 as the SIB19 reading cycle for re-acquiring the SIB19, based on a maximum value of the periodicity value of the SIB19, based on the periodicity value of the SIB19 indicating an on-demand SIB; and reading, by the UE, the SIB19 immediately through the on-demand SIB and repeating reading, until the SIB19 has acquired.

For example, the method comprises verifying, by the UE, a periodicity value of the SIB19, based on the RRC state being the RRC idle state; calculating, by the UE, a number of periodicity values of the SIB19 remaining in the current UL Sync validity duration time period, based on the periodicity value of the SIB19 as broadcasted by the network in SIB1; calculating, by the UE, a number of periodicity values of the SIB19 remaining in the current UL Sync validity duration time period, based on a maximum value of the periodicity value of the SIB19, based on the periodicity value of the SIB19 indicating an on-demand SIB; evaluating, by the UE, one or more iterations remaining to read the SIB19, based on the calculated number of periodicity values of the SIB19 remaining in the current UL Sync validity duration time period; updating, by the UE, an SIB19 reading cycle on appropriate iteration less than an iteration determined for the RRC connected state scenario from the evaluated one or more iterations; and determining, by the UE, the subsequent periodicity value of the SIB19, based on the updated SIB19 reading cycle to re-acquire the SIB19.

For example, the method of updating the timer value as the NTN UL Sync validity duration (T430) based on the SIB19 being re-acquired, comprises monitoring, by the UE, the emergency call status of the UE on each periodicity value of the SIB19; reading, by the UE, the SIB19, based on the updated SIB19 reading cycle on the appropriate iteration higher than an iteration determined for the RRC idle state scenario, based on the RRC state being an RRC connected state and the current status of the UE being data activity or voice call and emergency call not ongoing, for re-acquiring the SIB19 in a current serving cell; reading, by the UE, the SIB19 on each iteration of the determined subsequent periodicity value of the SIB19 or immediately through the on-demand SIB, and repeating reading until the SIB19 has acquired, based on the RRC state being the RRC connected state and the emergency call ongoing, for re-acquiring the SIB19 in the current serving cell; reading, by the UE, the SIB19, based on the updated SIB19 reading cycle on the appropriate iteration less than an iteration determined for the RRC connected state scenario, based on the RRC state being the RRC idle state, for re-acquiring the SIB19 in the current serving cell; reading, by the UE, the SIB19 on each periodicity value of the SIB19, until the SIB19 has acquired; and updating, by the UE, the timer value as the NTN UL Sync validity duration based on the SIB19 being re-acquired, before the expiry of the time-lapse of the NTN UL Sync validity duration.

For example, the UE restarts the timer value of the updated NTN UL Sync validity duration.

According to embodiments, a User Equipment (UE) us provided. The UE comprises a memory; and at least one processor, comprising processing circuitry, individually and/or collectively, configured to, determine a subsequent periodicity value of a System Information (SI) to re-acquire the SI, based on a plurality of parameters and a plurality of states; and update, a timer value as an non-terrestrial network (NTN) UL Sync validity duration based on the SI being re-acquired, before the expiry of a time-lapse of the NTN UL Sync validity duration, based on the determined subsequent periodicity value of the SI.

For example, the plurality of parameters comprise at least one of a current UL Sync validity duration, the an NTN UL Sync validity duration, ephemeris data, common Timing Advance (TA) parameters, k_offset, and validity duration for UL sync information and epoch, and the plurality of states comprises at least one of a Radio Resource Control (RRC) state, an emergency call status of the UE, and a periodicity value of the SI.

For example, at least one processor, individually and/or collectively, is configured to set a timer value of the current UL Sync validity duration in a specified ratio of the NTN UL Sync validity duration; and verify the RRC state and the emergency call status of the UE, based on expiry of the set timer value of the current UL Sync validity duration.

For example, the UE is configured to set the timer value of the current UL Sync validity duration as half of the NTN UL Sync validity duration.

For example, the SI of the serving cell comprises a System Information Block 19 (SIB19).

For example, at least one processor, individually and/or collectively, is configured to verify a periodicity value of the SIB19, based on the RRC state being an RRC connected state and a current status of the UE being data activity or a voice call and emergency call not ongoing; calculate a number of periodicity values of the SIB19 remaining in the current UL Sync validity duration time period, based on the periodicity value of the SIB19 as broadcasted by the network in SIB1; calculate a number of periodicity values of the SIB19 remaining in the current UL Sync validity duration time period, based on a maximum value of the periodicity value of the SIB19, based on the periodicity value of the SIB19 indicating an on-demand SIB; evaluate one or more iterations remaining to read the SIB19, based on the calculated number of periodicity values of the SIB19 remaining in the current UL Sync validity duration time period; update an SIB19 reading cycle as appropriate iteration higher than an iteration determined for an RRC idle state scenario from the evaluated one or more iterations; and determine the subsequent periodicity value of the SIB19, based on the updated SIB19 reading cycle to re-acquire the SIB19.

For example, at least one processor, individually and/or collectively, is configured to verify a periodicity value of the SIB19, based on the RRC state being the RRC connected state and the current status of the UE being emergency call ongoing; determine the subsequent periodicity value of the SIB19 as the SIB19 reading cycle for re-acquiring the SIB19, based on the periodicity value of the SIB19 as broadcasted by the network in SIB1; read the SIB19 on each iteration of the determined subsequent periodicity value of the SIB19, until the SIB19 has acquired; determine a current periodicity value of the SIB19 as the SIB19 reading cycle for re-acquiring the SIB19, based on a maximum value of the periodicity value of the SIB19, based on the periodicity value of the SIB19 indicating an on-demand SIB; and read the SIB19 immediately through the on-demand SIB and repeating reading, until the SIB19 has acquired.

For example, at least one processor, individually and/or collectively, is configured to verify a periodicity value of the SIB19, based on the RRC state being the RRC idle state; calculate a number of periodicity values of the SIB19 remaining in the current UL Sync validity duration time period, based on the periodicity value of the SIB19 as broadcasted by the network in SIB1; calculate a number of periodicity values of the SIB19 remaining in the current UL Sync validity duration time period, based on a maximum value of the periodicity value of the SIB19, based on the periodicity value of the SIB19 indicating an on-demand SIB; and evaluate one or more iterations remaining to read the SIB19, based on the calculated number of periodicity values of the SIB19 remaining in the current UL Sync validity duration time period; update an SIB19 reading cycle on appropriate iteration less than an iteration determined for the RRC connected state scenario from the evaluated one or more iterations; and determine the subsequent periodicity value of the SIB19, based on the updated SIB19 reading cycle to re-acquire the SIB19.

For example, at least one processor, individually and/or collectively, is configured to monitor the emergency call status of the UE on each periodicity value of the SIB19; read the SIB19, based on the updated SIB19 reading cycle as the appropriate iteration higher than an iteration determined for the RRC idle state scenario, based on the RRC state being an RRC connected state and the current status of the UE being data activity or voice call and emergency call not ongoing, for re-acquiring the SIB19 in a current serving cell; and read the SIB19 on each iteration of the determined subsequent periodicity value of the SIB19 or immediately through the on-demand SIB, and repeat reading until the SIB19 has acquired, based on the RRC state being the RRC connected state and the emergency call ongoing, for re-acquiring the SIB19 in the current serving cell; read the SIB19, based on the updated SIB19 reading cycle on the appropriate iteration less than an iteration determined for the RRC connected state scenario, based on the RRC state being the RRC idle state, for re-acquiring the SIB19 in the current serving cell; read the SIB19 on each periodicity value of the SIB19, until the SIB19 has acquired; and update the timer value as the NTN UL Sync validity duration based on the SIB19 being re-acquired, before the expiry of the time-lapse of the NTN UL Sync validity duration.

For example, the UE is configured to restart the timer value of the updated NTN UL Sync validity duration.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by a user equipment (UE) for an uplink synchronization (UL Sync) during non-terrestrial networks (NTN) connectivity, comprising:
   based on acquiring system information (SI) of a serving cell that indicates an NTN UL Sync validity duration, setting, by the UE, a value of a UL Sync timer to the NTN UL Sync validity duration and a value of an acquisition timer to a specified ratio of the NTN UL Sync validity duration;
   verifying, by the UE, a radio resource control (RRC) state and a call status of the UE based on expiry of the acquisition timer while the UL Sync timer is running;
   determining, by the UE, a subsequent periodicity for re-acquiring the SI, based on the RRC state and the call status of the UE;
   based on re-acquiring the SI of the serving cell, that indicates a new NTN UL Sync validity duration, in accordance with the subsequent periodicity, updating, by the UE, the value of the UL Sync timer as the new NTN UL Sync validity duration for the serving cell before an expiry of a time-lapse of the NTN UL Sync validity duration; and
   restarting, by the UE, the UL Sync timer with the updated value of the UL Sync timer.

2. The method as claimed in claim 1, wherein the value of the acquisition timer is set as half of the NTN UL Sync validity duration.

3. The method as claimed in claim 1, wherein the SI of the serving cell comprises a System Information Block 19 (SIB19).

4. The method as claimed in claim 3, wherein the determining of the subsequent periodicity comprises:
   verifying, by the UE, a periodicity value of the SIB19, based on the RRC state being an RRC connected state and the call status of the UE being data activity or voice call ongoing;
   in case that the SIB19 is broadcasted periodically, calculating, by the UE, a number of cycles of the SIB19 remaining until the expiry of the time-lapse of the NTN UL Sync validity duration, based on the periodicity value of the SIB19 as broadcasted by the network in System Information Block 1 (SIB1);
   in case that the SIB19 is provided through an on-demand SIB, calculating, by the UE, a number of cycles of the SIB19 remaining until the expiry of the time-lapse of the NTN UL Sync validity duration, based on a maximum value of a periodicity value of the SIB19; and
   determining, by the UE, the subsequent periodicity for re-acquiring the SI based on the calculated number of cycles of the SIB19,
   wherein the subsequent periodicity for re-acquiring the SI is shorter than a periodicity re-acquiring the SI determined for RRC idle state scenario.

5. The method as claimed in claim 3, wherein the determining of the subsequent periodicity comprises:
   verifying, by the UE, a periodicity value of the SIB19, based on the RRC state being the RRC connected state and the call status of the UE being emergency call ongoing;
   in case that the SIB19 is broadcasted periodically, determining, by the UE, the subsequent periodicity of the SIB19 as the periodicity value of the SIB19 as broadcasted by the network in SIB1 and attempt to re-acquire the SIB19 in next cycle of SIB19;

in case that the SIB19 is provided through an on-demand SIB, determining, by the UE, the subsequent periodicity of the SIB19 as a maximum value of a periodicity value of the SIB19 attempt to re-acquire the SIB19 immediately.

6. The method as claimed in claim 3, wherein the determining of the subsequent periodicity comprises:

verifying, by the UE, a periodicity value of the SIB19, based on the RRC state being the RRC idle state;

in case that the SIB19 is broadcasted periodically, calculating, by the UE, a number of cycles of the SIB19 remaining until the expiry of the time-lapse of the NTN UL Sync validity duration, based on the periodicity value of the SIB19 as broadcasted by the network in in System Information Block 1 (SIB1);

in case that the SIB19 is provided through an on-demand SIB, calculating, by the UE, a number of cycles of the SIB19 remaining until the expiry of the time-lapse of the NTN UL Sync validity duration, based on a maximum value of a periodicity value of the SIB19; and determining, by the UE, the subsequent periodicity for re-acquiring the SI based on the calculated number of cycles of the SIB19, wherein the subsequent periodicity for re-acquiring the SI is longer than a periodicity re-acquiring the SI determined for RRC connected state scenario.

7. The method as claimed in claim 3, wherein the method of updating the UL Sync timer as the new NTN UL Sync validity duration comprises:

monitoring, by the UE, the call status of the UE on each period of the SI;

in case that the RRC state is an RRC connected state and the call status of the UE does not indicate emergency call ongoing, reading, by the UE, the SIB19, based on a SIB19 reading cycle;

in case that the RRC state is an RRC connected state and the call status of the UE indicates emergency call ongoing, reading, by the UE, the SIB19 on a periodicity value of the SIB19 broadcasted by network or immediately through the on-demand SIB, and repeating reading until the SIB19 has acquired;

in case that the RRC state is an RRC idle state, reading, by the UE, the SIB19, based on another SIB19 reading cycle which is less frequent than SIB19 reading cycle for the RRC connected state scenario; and updating, by the UE, the UL Sync timer value as the new NTN UL Sync validity duration based on the read SIB19, before the expiry of the time-lapse of the NTN UL Sync validity duration.

8. The method as claimed in claim 1, wherein the subsequent periodicity value is determined based on a plurality of parameters included in the SI of the serving cell, and wherein the plurality of parameters include at least one of a current UL Sync validity duration, the an NTN UL Sync validity duration, ephemeris data, common timing advance (TA) parameters, k_offset, the UL sync validity duration, and epoch time.

9. The method as claimed in claim 1, wherein the RRC state of the UE corresponds to one of a RRC connected state, a RRC inactive state, and a RRC idle state, and wherein the cell status of the UE indicates whether emergency call is ongoing or not.

10. The method as claimed in claim 1, wherein the UL sync timer is T430 timer which starts from subframe indicated by the epoch time included in the SI of the serving cell.

11. A user equipment (UE) for an uplink synchronization (UL Sync) during non-terrestrial networks (NTN) connectivity, comprising:

at least one processor, comprising processing circuitry; and memory, comprising one or more storage mediums, storing instructions that, when executed by the at least one processor individually and/or collectively, cause the UE to:

based on acquiring system information (SI) of a serving cell that indicates an NTN UL Sync validity duration, set a value of a UL Sync timer to the NTN UL Sync validity duration and a value of an acquisition timer to a specified ratio of the NTN UL Sync validity duration;

verify a radio resource control (RRC) state and a call status of the UE based on expiry of the acquisition timer while the UL Sync timer is running;

determine a subsequent periodicity for re-acquiring the SI, based on the RRC state and the call status of the UE;

based on re-acquiring the SI of the serving cell, that indicates a new NTN UL Sync validity duration, in accordance with the subsequent periodicity, update the value of the UL Sync timer as the new NTN UL Sync validity duration for the serving cell before an expiry of a time-lapse of the NTN UL Sync validity duration; and restart the UL Sync timer with the updated value of the UL Sync timer.

12. The UE as claimed in claim 11, wherein the value of the acquisition timer is set as half of the NTN UL Sync validity duration.

13. The UE as claimed in claim 11, wherein the SI of the serving cell comprises a System Information Block 19 (SIB19).

14. The UE as claimed in claim 11, wherein the instructions, when executed by the at least one processor, cause the UE to:

verify a periodicity value of the SIB19, based on the RRC state being an RRC connected state and the call status of the UE being data activity or voice call ongoing;

in case that the SIB19 is broadcasted periodically, calculate a number of cycles of the SIB19 remaining until the expiry of the time-lapse of the NTN UL Sync validity duration, based on the periodicity value of the SIB19 as broadcasted by the network in System Information Block 1 (SIB1);

in case that the SIB19 is provided through an on-demand SIB, calculate a number of cycles of the SIB19 remaining until the expiry of the time-lapse of the NTN UL Sync validity duration, based on a maximum value of a periodicity value of the SIB19; and determine the subsequent periodicity for re-acquiring the SI based on the calculated number of cycles of the SIB19, wherein the subsequent periodicity for re-acquiring the SI is shorter than a periodicity re-acquiring the SI determined for RRC idle state scenario.

15. The UE as claimed in claim 13, wherein the instructions, when executed by the at least one processor, cause the UE to:

verify a periodicity value of the SIB19, based on the RRC state being the RRC connected state and the call status of the UE being emergency call ongoing;

in case that the SIB19 is broadcasted periodically, determine the subsequent periodicity of the SIB19 as the periodicity value of the SIB19 as broadcasted by the network in SIB1 and attempt to re-acquire the SIB19 in next cycle of SIB19;

in case that the SIB19 is provided through an on-demand SIB, determine the subsequent periodicity of the SIB19 as a maximum value of a periodicity value of the SIB19 attempt to re-acquire the SIB19 immediately.

16. The UE as claimed in claim 13, wherein the instructions, when executed by the at least one processor, cause the UE to:

verify a periodicity value of the SIB19, based on the RRC state being the RRC idle state;

in case that the SIB19 is broadcasted periodically, calculate a number of cycles of the SIB19 remaining until the expiry of the time-lapse of the NTN UL Sync validity duration, based on the periodicity value of the SIB19 as broadcasted by the network in in System Information Block 1 (SIB1);

in case that the SIB19 is provided through an on-demand SIB, calculate a number of cycles of the SIB19 remaining until the expiry of the time-lapse of the NTN UL Sync validity duration, based on a maximum value of a periodicity value of the SIB19; and determine the subsequent periodicity for re-acquiring the SI based on the calculated number of cycles of the SIB19, wherein the subsequent periodicity for re-acquiring the SI is longer than a periodicity re-acquiring the SI determined for RRC connected state scenario.

17. The UE as claimed in claim 13, wherein the instructions, when executed by the at least one processor, cause the UE to:

monitor the call status of the UE on each period of the SI;

in case that the RRC state is an RRC connected state and the call status of the UE does not indicate emergency call ongoing, reading the SIB19, based on a SIB19 reading cycle;

in case that the RRC state is an RRC connected state and the call status of the UE indicates emergency call ongoing, read the SIB19 on a periodicity value of the SIB19 broadcasted by network or immediately through the on-demand SIB, and repeating reading until the SIB19 has acquired;

in case that the RRC state is an RRC idle state, read the SIB19, based on another SIB19 reading cycle which is less frequent than SIB19 reading cycle for the RRC connected state scenario; and update the UL Sync timer value as the new NTN UL Sync validity duration based on the read SIB19, before the expiry of the time-lapse of the NTN UL Sync validity duration.

18. The UE as claimed in claim 13, wherein the subsequent periodicity value is determined based on a plurality of parameters included in the SI of the serving cell, and wherein the plurality of parameters include at least one of a current UL Sync validity duration, the an NTN UL Sync validity duration, ephemeris data, common timing advance (TA) parameters, k_offset, the UL sync validity duration, and epoch time.

19. The UE as claimed in claim 11, wherein the RRC state of the UE corresponds to one of a RRC connected state, a RRC inactive state, and a RRC idle state, and wherein the cell status of the UE indicates whether emergency call is ongoing or not.

20. A non-transitory computer readable storage medium storing instructions that when executed by at least one processor individually and/or collectively, cause a user equipment (UE) for an uplink synchronization (UL Sync) during non-terrestrial networks (NTN) connectivity to:

based on acquiring system information (SI) of a serving cell that indicates an NTN UL Sync validity duration, set a value of a UL Sync timer to the NTN UL Sync validity duration and a value of an acquisition timer to a specified ratio of the NTN UL Sync validity duration;

verify a radio resource control (RRC) state and a call status of the UE based on expiry of the acquisition timer while the UL Sync timer is running;

determine a subsequent periodicity for re-acquiring the SI, based on the RRC state and the call status of the UE;

based on re-acquiring the SI of the serving cell, that indicates a new NTN UL Sync validity duration, in accordance with the subsequent periodicity, update the value of the UL Sync timer as the new NTN UL Sync validity duration for the serving cell before an expiry of a time-lapse of the NTN UL Sync validity duration; and restart the UL Sync timer with the updated value of the UL Sync timer.

* * * * *